US009212328B2

(12) United States Patent
Kania et al.

(10) Patent No.: US 9,212,328 B2
(45) Date of Patent: Dec. 15, 2015

(54) APPARATUS AND METHOD FOR CONVERTING BIOMASS TO FEEDSTOCK FOR BIOFUEL AND BIOCHEMICAL MANUFACTURING PROCESSES

(75) Inventors: John Kania, Madison, WI (US); Ming Qiao, Pewaukee, WI (US); Elizabeth M. Woods, Middleton, WI (US); Randy D. Cortright, Madison, WI (US); Paul Myren, Madison, WI (US)

(73) Assignee: Virent, Inc., Madison, WI (US)

( * ) Notice: Subject to any disclaimer, the term of this patent is extended or adjusted under 35 U.S.C. 154(b) by 897 days.

(21) Appl. No.: 13/462,378

(22) Filed: May 2, 2012

(65) Prior Publication Data

US 2012/0280175 A1 Nov. 8, 2012

Related U.S. Application Data

(60) Provisional application No. 61/481,514, filed on May 2, 2011.

(51) Int. Cl.
| | | |
|---|---|---|
| *C07C 1/00* | (2006.01) | |
| *C10L 1/02* | (2006.01) | |
| *C10G 3/00* | (2006.01) | |

(52) U.S. Cl.
CPC .... *C10L 1/02* (2013.01); *C10G 3/00* (2013.01)

(58) Field of Classification Search
CPC .......... C10G 1/008; C10G 3/42; C10G 35/04; C10G 50/00; C10G 70/048; C10G 2300/1011; C10G 2300/44; C10G 45/04; C10C 5/00; C10C 3/02; C10L 1/02
USPC ................... 585/240, 242; 422/231, 295, 292
See application file for complete search history.

(56) References Cited

U.S. PATENT DOCUMENTS

| | | | |
|---|---|---|---|
| 4,657,681 | A | 4/1987 | Hughes et al. |
| 5,666,890 | A | 9/1997 | Craig |
| 7,767,867 | B2 | 8/2010 | Cortright |
| 7,872,054 | B2 | 1/2011 | Cortright et al. |
| 8,642,813 | B2 * | 2/2014 | Qiao et al. ..................... 568/22 |
| 9,045,383 | B2 * | 6/2015 | Qiao et al. .................... 585/240 |
| 2007/0000177 | A1 | 1/2007 | Hippo et al. |

(Continued)

FOREIGN PATENT DOCUMENTS

| | | |
|---|---|---|
| WO | 2009037281 A2 | 3/2009 |
| WO | 2009124017 A2 | 10/2009 |
| WO | 2009146225 A1 | 12/2009 |
| WO | 2010025241 A2 | 3/2010 |

OTHER PUBLICATIONS

Michael L. Swanson, et al.; Feed System Innovation for Gasification of Locally Economical Alternative Fuels (FIGLEAF); Final Report prepared for AAD Document Control, U.S. Department of Energy; Feb. 2003; 8 pages; Grand Forks, North Dakota.

(Continued)

*Primary Examiner* — Nina Bhat
(74) *Attorney, Agent, or Firm* — Quarles & Brady LLP

(57) ABSTRACT

The present invention includes improved systems and methods for producing biomass-derived feedstocks for biofuel and biochemical manufacturing processes. The systems and methods use components that are capable of transferring relatively high concentrations of solid biomass utilizing pressure variations between vessels, and allows for the recovery and recycling of heterogeneous catalyst materials.

35 Claims, 24 Drawing Sheets

(56) References Cited

U.S. PATENT DOCUMENTS

| | | | |
|---|---|---|---|
| 2009/0218061 A1* | 9/2009 | Schinski et al. | 162/189 |
| 2010/0228062 A1* | 9/2010 | Babicki et al. | 585/240 |
| 2010/0256428 A1* | 10/2010 | Marker et al. | 585/240 |
| 2012/0116105 A1* | 5/2012 | Aaltonen et al. | 554/20 |
| 2015/0175720 A1* | 6/2015 | Fouarge et al. | 585/240 |

OTHER PUBLICATIONS

DC Elliott, et al.; 3.1.1.2 Feed Processing and Handling; DL2 Final Report prepared for the U.S. Department of Energy; Sep. 2006; 59 pages; United States of America.

Parr Instrument Company; Laboratory Reaction Systems; TechNotes Bulletin No. 202; Dec. 17, 2009; 17 pages; Moline, Illinois.

Environmental Engineering Science; Chapter 6 Water Quality Engineering; Section 6.0 Physical Treatment Methods, pp. 305-310; published 2001.

Beckman, Comparisons of the Yields and Properties of the Oil Products from Direct Thermochemical Biomass Liquefaction Processes, The Canadian Journal of Chemical Engineering, 1985, 63:99-104.

PCT International Search Report and Written Opinion, PCT/US2012/036118, Oct. 5, 2012.

* cited by examiner

APPARATUS AND METHOD FOR CONVERTING BIOMASS TO FEEDSTOCK FOR BIOFUEL AND BIOCHEMICAL MANUFACTURING PROCESSES

CROSS-REFERENCE TO RELATED APPLICATIONS

This application claims the benefit of U.S. Provisional Patent Application Ser. No. 61/481,514, filed on May 2, 2011, and entitled "APPARATUS AND METHOD FOR CONVERTING BIOMASS TO LIQUEFIED FEEDSTOCK FOR BIOFUEL MANUFACTURING PROCESSES".

STATEMENT REGARDING FEDERALLY SPONSORED RESEARCH OR DEVELOPMENT

This invention was made with government support under Award No. 70NANB7H7023, Requisition #4700558, awarded by NIST through the ATP program and Award No. DE-EE0003044 awarded by the U.S. Department of Energy. The government has certain rights in the invention.

BACKGROUND OF THE INVENTION

This invention generally relates to systems and methods for producing feedstock for biofuel and biochemical manufacturing processes, particularly systems and methods capable of receiving slurries having relatively high solids concentrations and capable of recycling a catalyst.

In recent years, biomass (i.e., recently living organisms or materials derived from living or recently living organisms) has been considered as an energy resource due to the increasing global demand for energy and decreasing reserves of traditional energy resources, such as oil, coal, and the like. However, the widespread use of biomass-based energy is currently limited because biomass processing costs are still relatively high compared to those of traditional energy resources.

The high processing costs of biomass-based energy can be attributed to various factors. One of these factors is the relatively low throughput of biomass processing systems. In particular, biomass is typically transferred through system conduits in the form of a partial liquid and partial solid slurry. To move such a slurry through the conduits, the processing systems typically include one or more pumps. However, these pumps are only operable when the pumped material is mostly liquid. As such, the amount of biomass that can be processed at one time is limited by the percentage of biomass that can be pumped and transferred through the system's conduits. The water requirement to produce the slurry also adds to processing costs due to the increased energy necessary to heat the water.

The relatively low throughput of biomass processing systems is also affected by relatively slow processing steps. One such step is the batch-wise removal of a catalyst, which is initially used to increase the speed of biomass conversion, from the converted biomass product.

Therefore, what is needed are systems and methods for converting higher concentrations of biomass to feedstock for biofuel and biochemical manufacturing processes and for removing a catalyst from the feedstock in a more efficient manner.

SUMMARY OF THE INVENTION

The present invention provides improved systems and methods for producing feedstock for biofuel and biochemical manufacturing processes. In particular, some systems and methods according to the present invention use components that are capable of transferring relatively high concentrations of solid biomass. In addition, some systems and methods according to the present invention recycle a deconstruction catalyst which thereby increases throughput compared to previous designs.

In one aspect, the present invention provides an apparatus for producing feedstock for biofuel and biochemical manufacturing processes. The apparatus comprises a biomass hopper configured to receive biomass to be converted into the feedstock. A pressurization vessel is in selective communication with the biomass hopper to selectively receive biomass from the biomass hopper. The pressurization vessel includes pressurized fluid inlets such that the pressurization vessel is configured to selectively receive pressurized fluids, such as water or a solvent, and/or hydrogen gas. The pressurization vessel also includes a catalyst inlet such that the pressurization vessel is configured to selectively receive a catalyst. The apparatus further includes a deconstruction vessel in selective communication with the pressurization vessel to selectively receive pressurized biomass, pressurized fluid and the catalyst from the pressurization vessel. The deconstruction vessel is configured to convert the pressurized biomass into the feedstock and gaseous products. The apparatus further includes a valve operable to move from a closed position to an open position. In the closed position the valve isolates the pressurization vessel from the deconstruction vessel and permits the pressurized fluid to create a pressure differential between the pressurization vessel and the deconstruction vessel. In the open position the valve permits fluid communication between the pressurization vessel and the deconstruction vessel such that the pressurization vessel delivers to the pressurized biomass and the catalyst to the deconstruction vessel due to the pressure differential.

In another aspect, the present invention provides an apparatus for converting biomass to feedstock for biofuel and biochemical manufacturing processes. The apparatus comprises a deconstruction vessel configured to selectively receive biomass, water or solvent, hydrogen gas, and a catalyst from a pressurization vessel. The deconstruction vessel is configured to convert the biomass into the feedstock. A gas separating vessel is in selective communication with the deconstruction vessel to selectively receive the feedstock, catalyst and any gaseous products (e.g., hydrogen, carbon monoxide, carbon dioxide, etc.) from the deconstruction vessel. The phase separation vessel is configured to permit the gaseous products to separate from the feedstock and catalyst. A gravitational settling vessel is in selective communication with the phase separation vessel to selectively receive the feedstock and the catalyst from the phase separation vessel. The gravitational settling vessel is configured to permit the feedstock and the catalyst to separate from each other. A return conduit is in communication with the gravitational settling vessel and the pressurization vessel to return the catalyst to the pressurization vessel.

In yet another aspect, the present invention provides a method of converting biomass to feedstock for biofuel and biochemical manufacturing processes. The method comprises the steps of a) delivering biomass to a biomass hopper, b) transferring biomass from the biomass hopper to a pressurization vessel, c) delivering a catalyst, and water or solvent to the pressurization vessel, d) pressurizing the biomass and the catalyst contained in the pressurization vessel with hydrogen gas, e) transferring pressurized biomass and the catalyst from the pressurization vessel to a deconstruction vessel, f) converting biomass to feedstock and gaseous products within the deconstruction vessel, g) transferring feedstock, catalyst and gaseous products from the deconstruction vessel to a gas separating vessel, h) separating the gaseous products from the feedstock and catalyst, i) transferring feedstock and catalyst to a settling tank, j) separating feedstock from the catalyst in the settling tank, k) transferring the catalyst from the settling tank to the pressurization vessel, and l) collecting the feedstock.

In yet another aspect, the present invention provides an apparatus for producing feedstock for biofuel and biochemical manufacturing processes. The apparatus includes a biomass hopper configured to receive biomass to be converted into the feedstock. A deconstruction vessel is in selective communication with the biomass hopper to selectively receive biomass from the biomass hopper and a catalyst. The deconstruction vessel is configured to convert the biomass into the feedstock and gaseous products. A gravitational settling vessel is in selective communication with the deconstruction vessel to selectively receive the feedstock and the catalyst from the deconstruction vessel. The gravitational settling vessel is configured to permit the feedstock and the catalyst to separate from each other. A knockout pot is in communication with the deconstruction vessel to receive the gaseous products from the deconstruction vessel and collect the gaseous products.

The foregoing and advantages of the invention will appear in the detailed description which follows. In the description, reference is made to the accompanying drawings which illustrate a preferred embodiment of the invention.

BRIEF DESCRIPTION OF THE DRAWINGS

Further objects and advantages of the invention will appear when taken in conjunction with the accompanying drawings in which.

DETAILED DESCRIPTION OF THE PREFERRED EMBODIMENT

Referring now to FIGS. 1-4, a system 10 according to the present invention for producing feedstock for biofuel and biochemical manufacturing processes includes components that are capable of transferring relatively high concentrations of solid biomass (e.g., lignocellulosic biomass) compared to previous pump-based systems. Generally, to operate in this manner, the system 10 selectively maintains a pressure differential between several components. The pressure differential facilitates biomass transfer when these components are selectively placed in fluid communication. In addition, the system 10 also recycles a deconstruction catalyst, which thereby increases the throughput of the system 10 compared to previous systems. These aspects, further details of the system 10, and manner in which the system 10 interacts with biomass and other input materials are described below.

As used herein, the term "biomass" refers to, without limitation, organic materials produced by plants (e.g., wood, leaves, roots, seeds, stalks, etc.), and microbial and animal metabolic wastes. Common biomass sources include: (1) agricultural residues, such as corn stalks, straw, seed hulls, sugarcane leavings, bagasse, nutshells, and manure from cattle, poultry, and hogs; (2) wood materials, such as wood or bark, sawdust, timber slash, and mill scrap; (3) municipal waste, such as waste paper and yard clippings; (4) energy crops, such as algae, poplars, willows, switch grass, miscanthus, sorghum, alfalfa, prairie bluestream, corn, soybean, and the like; and (5) residual solids from industrial processes, such as lignin from pulping processes, acid hydrolysis or enzymatic hydrolysis. The term also refers to the primary building blocks of the above, namely, lignin, cellulose, and hemicellulose.

The resulting biomass-derived feedstocks can be in a single phase (e.g., vapor, liquid, solid) or multi-phase (e.g., liquid and one or more of a vapor and a solid). The feedstock may include oxygenated hydrocarbons, such as, carbohydrates (e.g., monosaccharides, disaccharides, oligosaccharides and other polysaccharides and starches, etc.), sugars (e.g., glucose, sucrose, xylose, etc.), sugar alcohols (e.g., diols, triols, and polyols), sugar degradation products (e.g., hydroxymethyl furfural (HMF), levulinic acid, formic acid, and furfural) and other defunctionalized sugar molecules (e.g., diols, ketones, aldehydes, cyclic ethers, alcohols, and acids).

Figure 1:
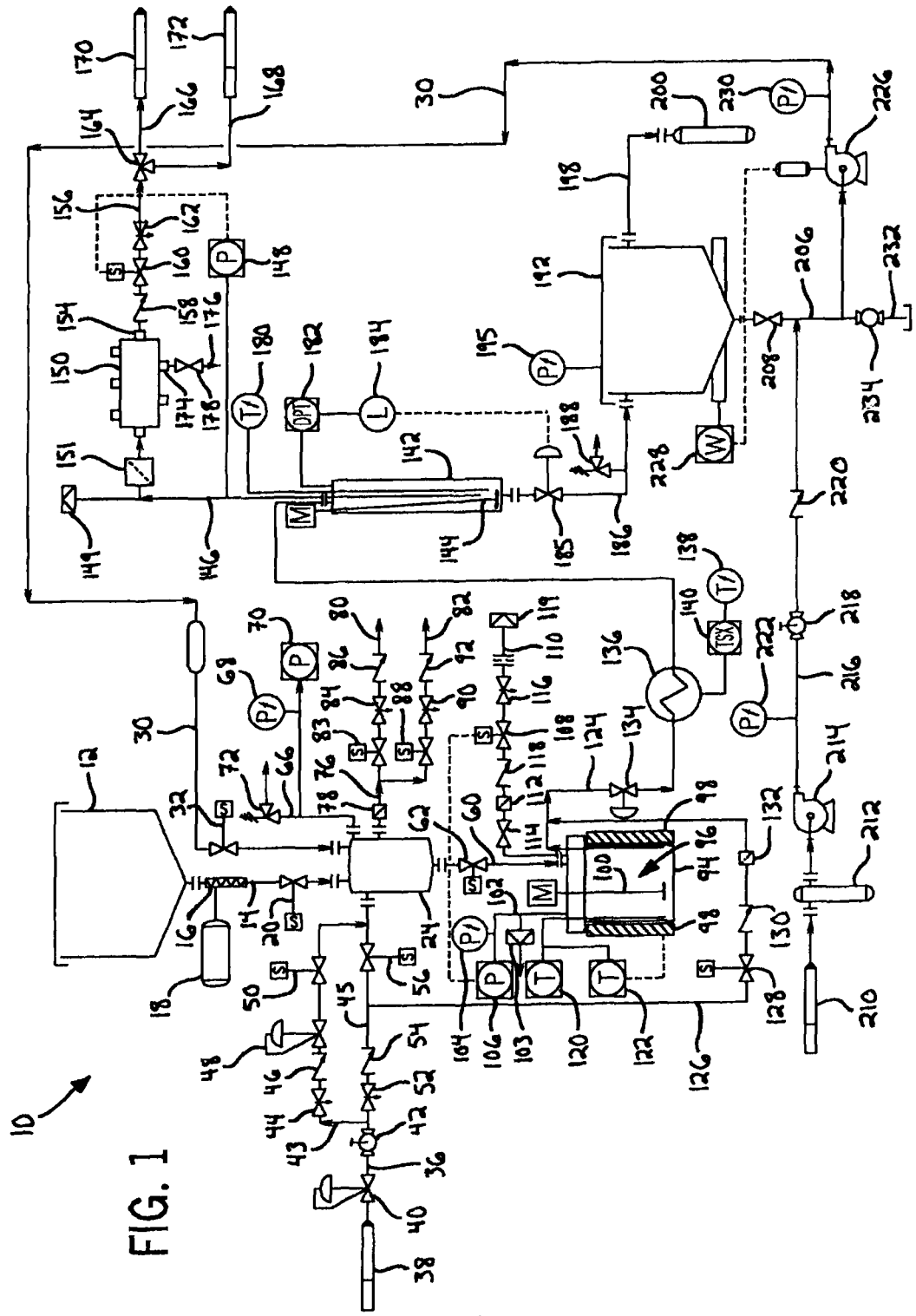
FIG. 1 is a schematic diagram of a system according to the present invention for producing feedstock for biofuel and biochemical manufacturing processes.

Referring first to FIG. 1, the system 10 initially receives biomass in a biomass hopper 12, such as a large tank having angled lower surfaces. The lower surfaces of the biomass hopper 12 direct biomass into an attached conduit 14. A delivery screw or auger 16 connected to the conduit 14 is driven by a motor 18 and thereby moves biomass through the conduit 14. The conduit 14 also includes a solenoid valve 20 that is selectively actuatable to permit biomass to move through the conduit 14. The solenoid valve 20 and the motor 18 may be in operative communication such that the motor 18 only drives the auger 16 when the solenoid valve 20 is open.

Figure 3:
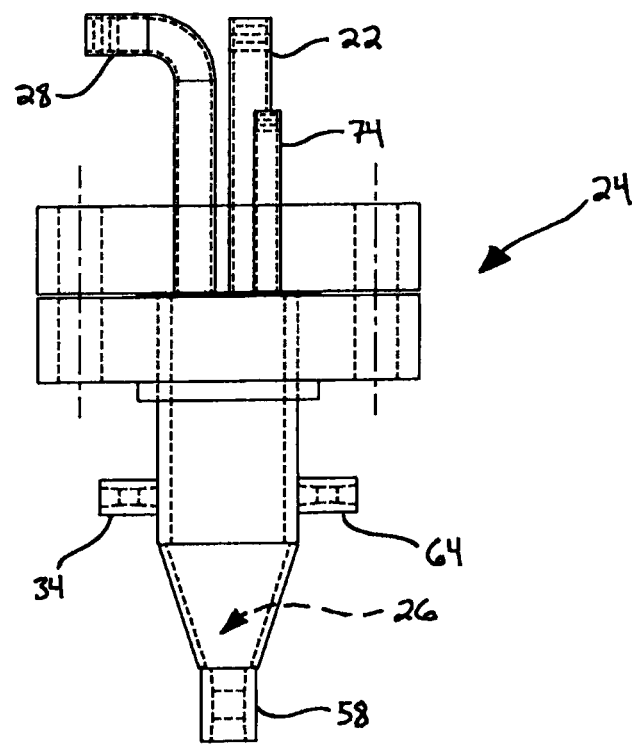
FIG. 3 is a side view of a pressurization vessel of the system of FIG. 1.

Referring now to FIGS. 1 and 3, the conduit 14 delivers the biomass to a biomass inlet 22 of a lock hopper or pressurization vessel 24 (shown alone in FIG. 3), and the biomass inlet 22 provides the biomass to a funnel-shaped internal pressurization vessel chamber 26. The pressurization vessel chamber 26 also receives appropriate amounts of other materials to form a slurry having a relatively high percentage of solid biomass (e.g., up to 50 percent or greater). This aspect provides the present system and method with a higher throughput than previous designs.

One of the other materials received by the pressurization vessel chamber 26 is a mixture of a recycled catalyst (e.g., nickel-boron on an activated carbon support) and a solvent for the biomass (e.g., water, deconstruction solvent, or the like). The solvent can be provided from an external source (e.g., a supply tank), recycled and/or derived from the system. In one embodiment, the solvent is derived from the processing of the biomass or the biomass-derived feedstock (e.g., production water, deoxygenation product, condensation product, or a portion of the biomass-derived feedstock). In such applications, the system-derived solvent can be derived from an intermediate and/or a product stream, a portion of which can be separated and recycled into the pressurization vessel chamber 26.

The pressurization vessel chamber 26 receives this mixture from a catalyst inlet 28 connected to a return conduit 30 (FIG. 1). A solenoid valve 32 connected to the conduit 30 controls delivery of the catalyst and solvent mixture to the pressurization vessel 24. Components that initially provide the mixture to the return conduit 30 are described in further detail below.

In addition, the pressurization vessel chamber 26 also receives a pressurized fluid, such as hydrogen gas, from a pressurized fluid inlet 34 connected to an external pressurized fluid conduit 36 (FIG. 1). The pressurized fluid advantageously provides the aforementioned pressure differential between the pressurization vessel 24 and an adjacent deconstruction vessel 94 to facilitate transfer of the biomass to the adjacent deconstruction vessel 94. In the following paragraph, the pressurized fluid conduit 36 and other components associated with the delivery of the pressurized gas are described briefly.

The pressurized gas is originally supplied from a gas supply 38, which may include a gas pipeline, cylinder, canister, or other pressurized gas containment device or supply system, connected to the opposite end of the pressurized fluid conduit 36. The gas exits the gas supply 38 and passes through a pressure regulator 40 (e.g., set to 2000 psig) and a ball valve 42 before the conduit 36 splits into a first branch 43 and a second branch 45. The first branch 43 initially provides relatively low-pressure gas that purges any oxygen from the pressurization vessel 24 that may have entered with the biomass and/or the catalyst mixture (such oxygen would exit through vent conduits described below). To this end, the first branch 43 includes a needle valve 44, a check valve 46, a pressure regulator 48 (e.g., set to 200 psig), and a solenoid valve 50 to control the gas flow rate and direction and reduce the gas pressure. In contrast, the second branch 45 subsequently provides gas to pressurize the pressurization vessel 24 (e.g., to a pressure of greater than 1000 psig). For this reason, the second branch 45 includes a needle valve 52, a check valve 54, and a solenoid valve 56 to control the gas flow rate and direction. Unlike the first branch 43, the second branch 45 does not include a pressure regulator, and as such the gas pressure is only regulated by the pressure regulator 40 proximate the cylinder 38.

After pressurizing the pressurization vessel chamber 26, the biomass, the catalyst, the solvent, and some of the pressurized gas are forced, due to the pressure differential, through an outlet 58 (FIG. 3) of the pressurization vessel 24 and into a conduit 60 (FIG. 1) by opening a solenoid valve 62 connected to the conduit 60. That is, the valve 62 is positionable in a closed position and an open position. In the closed position, the valve 62 isolates the pressurization vessel 24 from the deconstruction vessel 94 and advantageously permits the pressurized fluid to create the pressure differential between the pressurization vessel 24 and the deconstruction vessel 94. In the open position, the valve 62 permits fluid communication between the pressurization vessel 24 and the deconstruction vessel 94 such that the pressurization vessel 24 transfers the biomass and the catalyst toward the deconstruction vessel 94 due to the pressure differential. Before describing additional processing steps and components for the biomass, pressure-monitoring and gas-venting steps and components associated with the pressurization vessel 24 are described briefly.

During the above steps of providing biomass, the catalyst mixture, and the pressurized gas to the pressurization vessel 24, the pressure within the pressurization vessel chamber 26 is monitored and controlled by several components. In particular, gas within the pressurization vessel 24 is capable of passing through a first gas outlet 64 (FIG. 3) and into a conduit 66 (FIG. 1) in communication with a pressure gauge 68 and a pressure transmitter 70. The conduit 66 also includes a safety valve 72 set to a pressure of, e.g., 2500 psig to inhibit the gas from over-pressurizing the pressurization vessel 24.

After the biomass, the catalyst, the solvent, and some of the pressurized gas exit the pressurization vessel chamber 26, the gas remaining in the chamber 26 moves through a second gas outlet 74 (FIG. 3) and into a vent conduit 76 (FIG. 1). The vent conduit 76 includes an air filter 78 through which the gas passes before the conduit 76 splits into a first branch 80 and a second branch 82. The first branch 80 initially vents the gas at relatively high pressures (e.g., 1500 psig to 200 psig) and includes a solenoid valve 83 and a needle valve 84 that control the gas flow and gas flow rate through the first branch 80. The first branch 80 also includes check valve 86 that inhibits air from the outside environment from entering the first branch 80. To increase the gas ventilation rate at relatively low pressures (e.g., 200 psig to 0 psig), the gas is subsequently vented through the second branch 82 in addition to the first branch 80. The second branch 82 includes a solenoid valve 88 and a needle valve 90 that control the gas flow and gas flow rate through the second branch 82. The second branch 82 also includes a check valve 92 that inhibits air from the outside environment from entering the second branch 82. The valves on the second branch 82 are sized such that the Cv (flow coefficient) of the valves are larger than the Cv of the valves in the first branch 80 allowing for increased flow.

Returning now to the biomass processing, the conduit 60 delivers the biomass, the catalyst, the solvent, and some of the pressurized gas to a deconstruction vessel 94. In general, the deconstruction vessel 94 includes an internal deconstruction chamber 96 that is pressurized and heated (e.g., via heaters 98) to facilitate deconstruction of the biomass and dissolving the biomass in the solvent to form biofuel and biochemical manufacturing feedstock. In particular, the deconstruction vessel 94 may pressurize and heat lignocellulosic biomass, the catalyst, and the solvent to a pressure of 1000 to 2000 psig and a temperature of 200 to 350 degrees Celsius for five minutes to three hours to form mono- and poly-oxygenated hydrocarbons (e.g., sugars, polyols, alcohols, ketones, acids, and furans) and liquefied hydrocarbons (e.g., phenolics and aromatics). Further details of lignocellulosic biomass deconstruction are described in U.S. patent application Ser. No. 13/339,661 filed Dec. 29, 2011 and entitled "Organo-Catalytic Biomass Deconstruction" and U.S. patent application Ser. No. 13/339,553 filed Dec. 29, 2011 and entitled "Catalytic Biomass Deconstruction", the disclosures of which are hereby incorporated by reference in their entirety.

A suitable device for serving as the deconstruction vessel 94 as described above is a 4520 series reactor manufactured by Parr Instrument Company of Moline, Ill., although other similar devices may alternatively be used without departing from the scope of the invention. In either case, the deconstruction vessel 94 also includes a motor driven agitator 100 to facilitate movement of the biomass, the catalyst, the solvent and hydrogen interaction within the deconstruction vessel 94 and thereby increase the speed of biomass liquefaction.

The contents within the deconstruction vessel 94 are monitored by several components that are capable of venting the vessel 94 if it is over-pressurized. In particular, the deconstruction vessel 94 connects to a conduit 102 including a rupture disk 103 (e.g., set to 2000 psig) and in communication with a pressure gauge 104 and a pressure transmitter 106. If the pressure within the deconstruction vessel 94 exceeds a threshold, the pressure transmitter 106 sends a signal to open a solenoid valve 108 connected to a vent conduit 110. The vent conduit 110 further includes an air filter 112 and valves, such as a control valve 114, a needle valve 116, a check valve 118, and a rupture disk 119 (e.g., set to 2000 psig) that control the gas flow and direction though the vent conduit 110.

Similarly, the temperature within the deconstruction vessel 94 is monitored by several components. In particular, the deconstruction vessel 94 connects to a temperature sensor 120 (e.g., a thermocouple) that monitors the temperature in the deconstruction vessel 94. The temperature sensor 120 connects to a temperature controller 122 that controls the heaters 98 based on the temperature sensed by the temperature sensor 120.

After the biomass and the solvent in the deconstruction vessel 94 form biofuel and biochemical manufacturing feedstock, the feedstock and the catalyst are forced by the pressurized gas to exit the deconstruction vessel 94 and move into a delivery conduit 124. The delivery conduit 124 connects to a deconstruction vessel conduit 126 that receives pressurized gas directly from the second branch 45 of the pressurized fluid conduit 36. The conduit 126 includes a solenoid valve 128 that controls delivery of the pressurized gas to the delivery conduit 124, a check valve 130 that inhibits the pressurized gas from flowing in the opposite direction, and an air filter 132. The conduit 126 is used to back-flush the portion of conduit 124 inside the deconstruction vessel, such that no residual biomass is retained in conduit 124 at reaction temperature in the absence of hydrogen, catalyst, and solvent, as that may lead to charring of the biomass and could lead to plugging of conduit 124. The conduit 126 may also be used to deliver gas to pressurize the deconstruction vessel 94 while the biomass is deconstructed.

Downstream of the vessel conduit 126, the feedstock, the catalyst, and the pressurized gas pass through a high temperature control valve 134 that controls their flow in the delivery conduit 124. Further downstream, the feedstock, the catalyst, and the pressurized gas enter a heat exchanger 136 that cools the materials, preferably to less than 100 degrees Celsius. The outlet of the heat exchanger 136 includes a temperature sensor 138 and a temperature switch 140. If the temperature sensor 138 determines that the feedstock and the catalyst at the outlet exceeds a certain temperature threshold, the temperature switch 140 triggers an audible or visible alarm.

After passing through the heat exchanger 136, the delivery conduit 124 delivers the feedstock, the catalyst, and the pressurized gas to a gas separating vessel 142. The gas separating vessel 142 includes a motor-driven agitator 144 that inhibits the catalyst from settling in the gas separating vessel 142. In addition, gases within the separating vessel 142, such as gases produced by the feedstock and the pressurized gas, enter a gas outlet conduit 146 in communication with a pressure transmitter 148, a rupture disk 149 (e.g., set to 2000 psig), and an air filter 151 leading to a gas manifold 150. Before describing the gas separating vessel 142 in further detail, the gas manifold 150 and other associated components are described briefly.

The gas manifold 150 includes an inlet 152 through which the gases pass towards a first outlet 154. The first outlet 154 connects to a manifold outlet conduit 156 that includes a check valve 158, a solenoid valve 160 controlled by the pressure transmitter 148, and a needle valve 162 that control the gas flow rate and direction through the outlet conduit 156. Downstream of the valves 158, 160, and 162, the gases pass through a three-port valve 164 that splits the outlet conduit 156 into a first branch 166 and a second branch 168. When directed through a first outlet port of the valve 164, the gases enter a gas chromatography instrument 170 that analyzes their composition. On the other hand, when directed through a second outlet port of the valve 164, the gas enters a secondary cylinder 172.

To inhibit any liquids in the gas outlet conduit 146 from moving to and potentially damaging the gas chromatography instrument 170, the gas manifold 150 further includes a second outlet 174 connected to a liquid outlet conduit 176. The liquid outlet conduit 176 includes a control valve 178 that is actuatable to permit such liquids to drain from the system.

Returning now to the gas separating vessel 142, the temperature of the feedstock and the catalyst is monitored via a temperature sensor 180 (e.g., a thermocouple). Similarly, a differential pressure transmitter 182 monitors the amount of feedstock and the catalyst in the gas separating vessel 142. The differential pressure transmitter 182 communicates with a level controller 184 that opens a valve 185 to permit the feedstock and the catalyst to drain into a conduit 186. The conduit 186 includes a safety valve 188 set to a pressure of, e.g., 30 psig.

Figure 4:
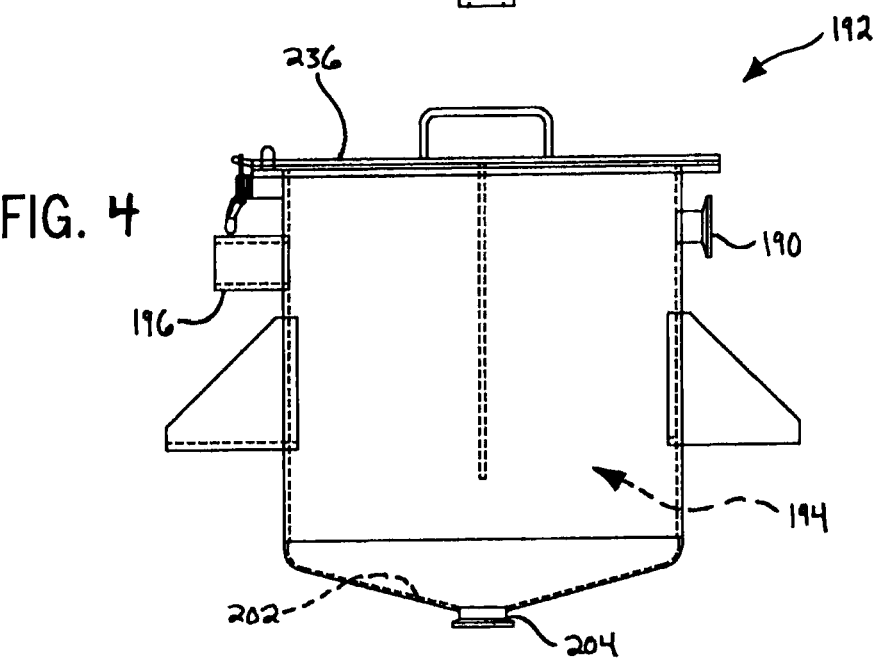
FIG. 4 is a side view of a gravitational settling vessel of the system of FIG. 1.
Figure 5A:
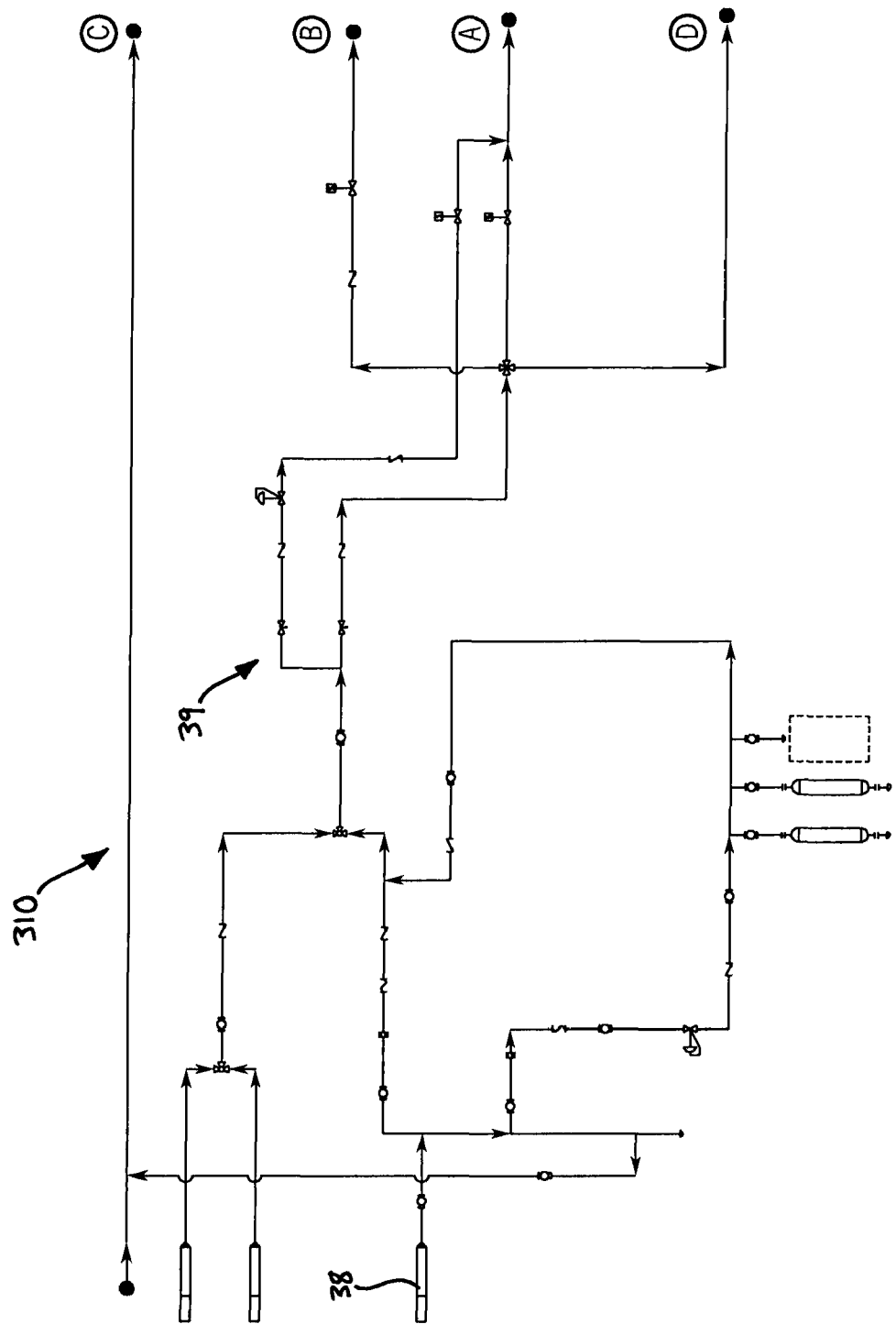
FIGS. 5A-C are a schematic diagram of a second embodiment of a system according to the present invention for producing feedstock for biofuel and biochemical manufacturing processes.
Figure 5B:
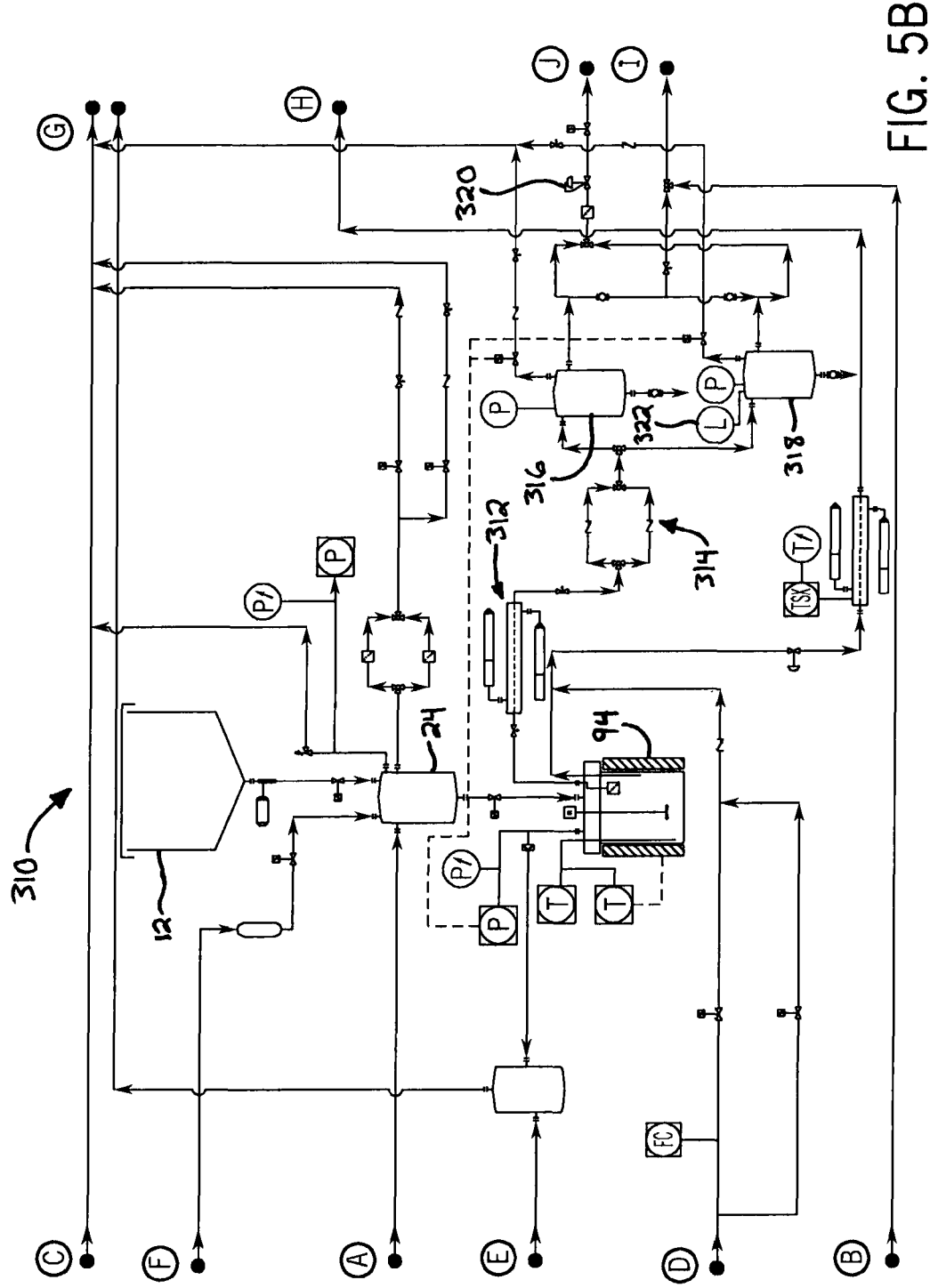
Figure 5C:
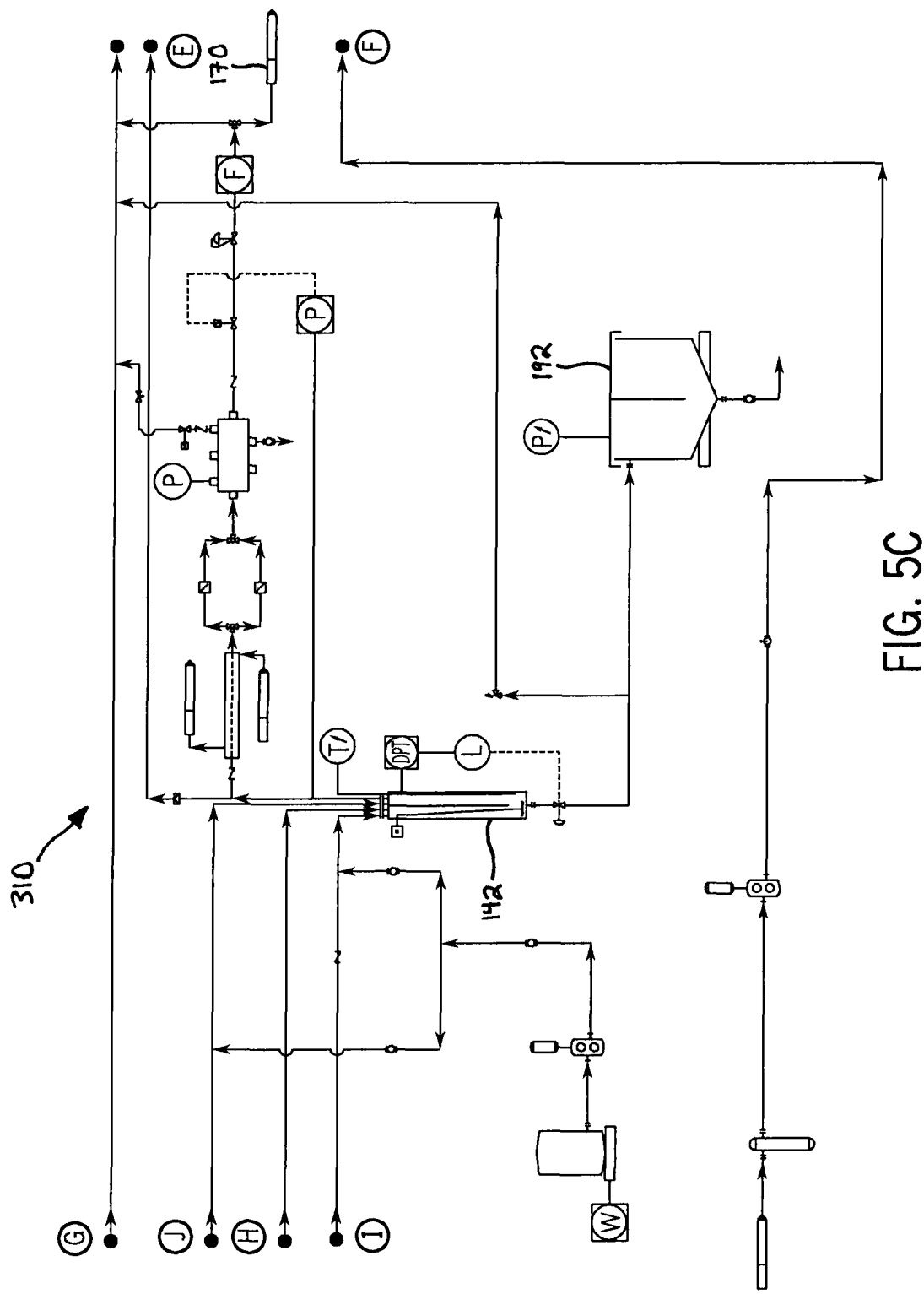
Figure 6:
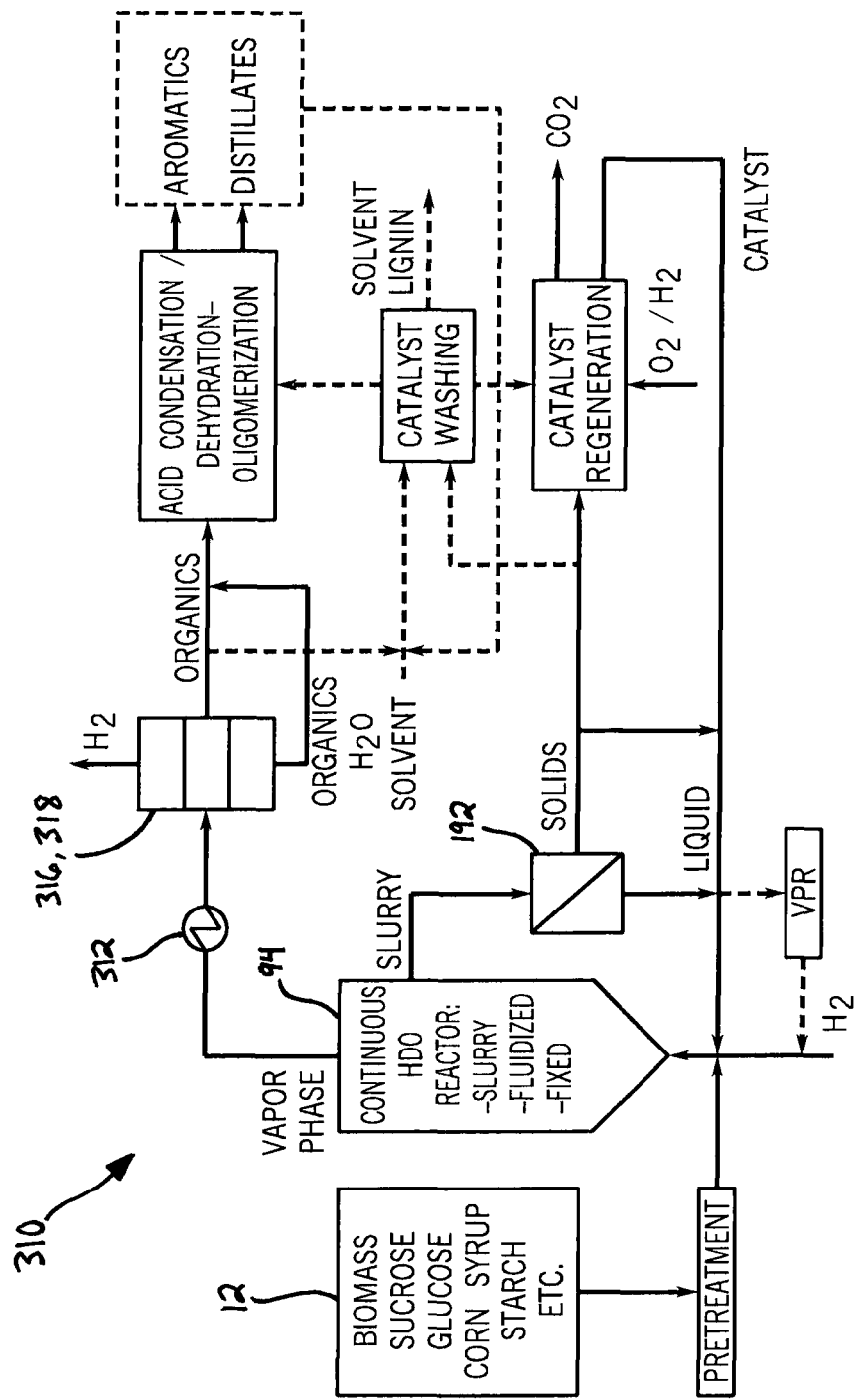
FIG. 6 is a schematic diagram of the system of FIGS. 5A-C further including acid condensation, catalyst washing, and vapor phase recycling components.

Referring now to FIGS. 1 and 4, after passing through the conduit 186, the feedstock and the catalyst pass through an inlet 190 (FIG. 4), such as a ferrule connector, of a gravitational settling vessel 192 (shown alone in FIG. 4). The inlet 190 delivers the feedstock and the catalyst to an internal gravitational settling vessel chamber 194 in which the feedstock separates from and floats above the solid catalyst. While the feedstock and the catalyst separate, a pressure gauge 195 indicates the pressure within the settling vessel chamber 194.

After separating, the feedstock passes from the chamber 194 through a feedstock outlet 196, such as a threaded coupling, and a conduit 198 (FIG. 1) to a downstream processing assembly (not shown) or a collection vessel 200 that can be detached from the conduit 198 when filled and delivered to a downstream processing system (not shown). Such downstream processing may be as described in U.S. Pat. Nos. 6,699,457; 6,964,757; 6,964,758; and 7,618,612 (all to Cortright et al., and entitled "Low-Temperature Hydrogen Production from Oxygenated Hydrocarbons"); U.S. Pat. No. 6,953,873 (to Cortright et al., and entitled "Low-Temperature Hydrocarbon Production from Oxygenated Hydrocarbons"); U.S. Pat. Nos. 7,767,867; 7,989,664; and U.S. Patent Application Ser. No. 2011/0306804 (all by Cortright, and entitled "Methods and Systems for Generating Polyols"); U.S. Pat. Nos. 8,053,615; 8,017,818; 7,977,517; and U.S. Patent Application Ser. Nos. 2011/0245543; 2011/0257416; 2011/0245542; and 2011/0257448 (all by Cortright and Blommel, and entitled "Synthesis of Liquid Fuels and Chemicals from Oxygenated Hydrocarbons"); U.S. Patent Application Ser. No. 2009/0211942 (by Cortright, and entitled "Catalysts and Methods for Reforming Oxygenated Compounds"); U.S. Patent Application Ser. No. 2010/0076233 (by Cortright et al., and entitled "Synthesis of Liquid Fuels from Biomass"); International Patent Application No. PCT/US2008/056330 (by Cortright and Blommel, and entitled "Synthesis of Liquid Fuels and Chemicals from Oxygenated Hydrocarbons"); and commonly owned co-pending International Patent Application No. PCT/US2006/048030 (by Cortright et al., and entitled "Catalyst and Methods for Reforming Oxygenated Compounds"), all of which are incorporated herein by reference.

Instead of passing through the feedstock outlet 196, the catalyst sinks to a funnel-shaped lower portion 202 (FIG. 4) of the settling vessel chamber 194. The funnel shape directs the catalyst to a catalyst outlet 204, such as a ferrule connector, at the bottom of the vessel 192. The catalyst passes from the catalyst outlet 204 to a catalyst conduit 206 (FIG. 1), and movement of the catalyst through the conduit 206 is controlled by a valve 208.

In order to move the catalyst in the catalyst conduit 206 and subsequently pump the catalyst, the conduit 206 also receives the biomass solvent (e.g., water or recycled liquefied product) that mixes with the catalyst. A solvent supply cylinder or canister 210 initially supplies this solvent to a storage vessel 212. A metering pump 214 then draws the solvent from the storage vessel 212 into a solvent supply conduit 216. The metering pump 214 drives the solvent through a ball valve 218 and a check valve 220 before the solvent supply conduit 216 connects the catalyst conduit 206. The solvent supply conduit 216 further includes a pressure gauge 222 that monitors the pressure in the solvent supply conduit 216.

The catalyst and solvent mixture enters the return conduit 30, which includes a motor-driven pump 226 that drives the catalyst and solvent mixture. The pump 226 is controlled by a weight transmitter 228 connected to the gravitational settling vessel 192 and configured to determine when a sufficient amount of catalyst is present in the gravitational settling vessel 192 for recycling. Downstream of the pump 226, the return conduit 30 includes a pressure gauge 230 that indicates the pressure of the catalyst and solvent mixture in the return conduit 30. The return conduit 30 ultimately connects to the pressurization vessel 24 to return the catalyst and solvent mixture thereto.

Over time, the catalyst can be deactivated by collecting carbon. In this case, the catalyst can be removed from the system to be regenerated (e.g., by heating the catalyst to a high temperature, such as greater than 350 degrees Celsius). To this end, the return conduit 30 connects to a catalyst purge conduit 232 from which the catalyst can be removed from the system. A ball valve 234 controls movement of the catalyst through the catalyst purge conduit 232. After the regeneration process, the catalyst may be returned to the system 10 by detaching a removable lid 236 (FIG. 4) of the gravitational settling vessel 192 and placing the catalyst in the settling vessel chamber 194. Alternatively, the catalyst may be returned to the system 10 by placing the catalyst in the pressurization vessel 24 when it is depressurized.

In addition to the above components, the system 10 may further include a processing device, such as a desktop computer or the like, that automatically controls the other components and the movement of biomass, the catalyst, the pressurized gas, and the solvent within the system. In particular, the processing device may be in communication with the various pressure and temperature transmitters and may automatically control the solenoid valves.

Figure 2:
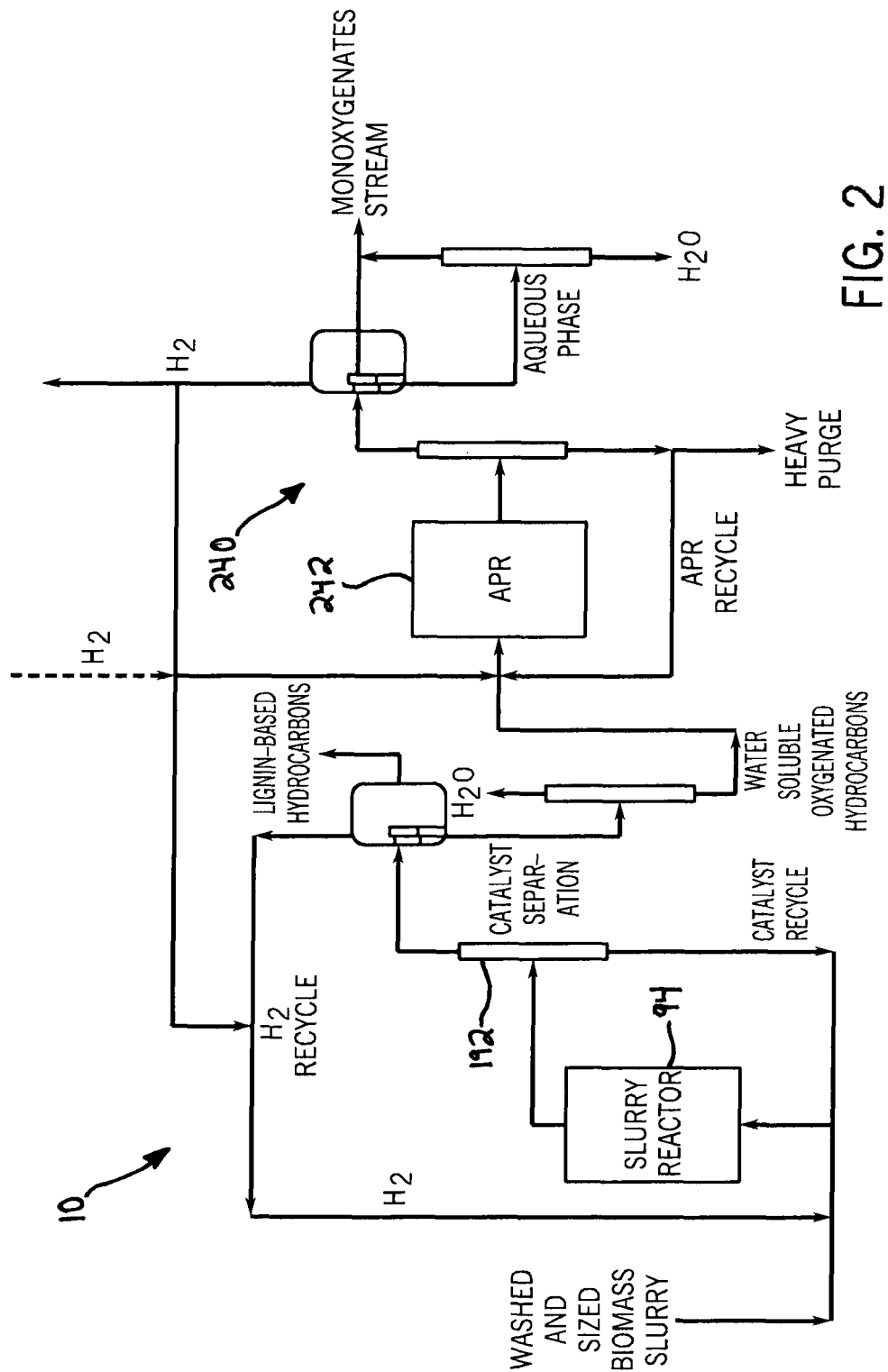
FIG. 2 is a schematic diagram of the system of FIG. 1 further including an APR assembly.

Turning now to FIG. 2, in some embodiments, the system 10 includes a deoxygenation assembly 240 (e.g., aqueous phase reforming (APR) system or hydrodeoxygenation (HDO) system) to produce mono-oxygenates for subsequent downstream processing (e.g., condensation (acid, base, acid/base catalyzed reactions) or as a solvent for the deconstruction of biomass). In these embodiments, the gravitational settling vessel 192 delivers the poly-oxgenated hydrocarbon-rich aqueous product (i.e., the feedstock) to a deoxygenation reactor 242 (e.g., APR and/or HDO reactor) to produce the mono-oxygenates for subsequent downstream processing (e.g., condensation or as a solvent for the deconstruction of biomass). The resulting gas phase, which consists mostly of carbon dioxide and volatile hydrocarbons, is recycled for use as a pressurized gas, burned for process heat, or vented.

Turning now to FIGS. 5A-C and 6, a second embodiment of a system 310 according to the present invention for producing feedstock for biofuel and biochemical manufacturing processes has many similarities to the system described above. In particular, the system 310 includes a biomass hopper 12 (FIG. 5B) that initially delivers biomass to a pressurization vessel 24. The pressurization vessel 24 also receives pressurized gas from a gas supply 38 (FIG. 5A) and a gas supply assembly 39 to purge any oxygen from the pressurization vessel 24. The pressurization vessel 24 delivers biomass, catalyst, solvent, and some of the pressurized gas to a deconstruction vessel 94 that facilitates deconstruction and dissolving of the biomass in the solvent to form biofuel and biochemical manufacturing feedstock. The deconstruction vessel 94 delivers the feedstock and the catalyst to a separating vessel 142 (FIG. 5C), which in turn delivers gas to a gas manifold 150 and a gas chromatography instrument 170. The separating vessel 142 also delivers the feedstock, unreacted biomass, and catalyst to a gravitational settling vessel 192. The system 310 also includes components (not shown) for recycling the catalyst from the settling vessel 192 to the pressurization vessel 24. The system 310 advantageously continuously performs vapor phase sparging during the reaction to condense the volatile components of the gas phase that are vented in the first embodiment of the system 10. As a result, the system 310 produces a mono-oxygenate rich stream that is ready for immediate downstream processing (i.e., the stream need not be directed to an APR and/or HDO reactor before undergoing downstream processing).

To realize these advantages, a continuous pressurized gas stream (e.g., a hydrogen stream, inert gas, or product gas from the deoxygenation assembly) is sparged through the biomass and catalyst during the reaction. Sparging is used to remove desired products to prevent unwanted side reactions (e.g., degradation reactions). This causes lighter material to exit the deconstruction vessel 94 and pass through a heat exchanger 312 (e.g., a tube-in-tube condenser). The stream then flows through a check valve assembly 314 and into one of two knockout pots 316, 318 arranged in parallel to each other. The knockout pots 316, 318 collect the condensed volatiles and are kept at pressure by a downstream back pressure regulator 320. One of the pots 318 contains a level indicator 322 which provides an alert when the pot 318 is full or nearly full. When the alert is provided, the stream is directed to the other pot 316. The pot 318 is then drained and the stream is again directed to the pot 318 thereafter. The feedstock and the catalyst are transferred to the separating vessel 142 in the same manner as in the first system 10. The system 310 also recycles the non-volatile aqueous back to the deconstruction vessel 94 to be used as a solvent and further convert the leftover poly-oxygenates. As described above, the product is a mono-oxygenate rich stream that is ready for immediate downstream processing.

The system 310 advantageously facilitates continuous collection of the volatile components as mono-oxygenates and organics before over-conversion can occur, as it does with the system 10. As a result, a greater amount of the feedstock carbon is conserved by reducing the carbon loss to carbon dioxide and other non-usable gaseous components.

Systems and methods according to the present invention may also be modified in other manners that are not explicitly described above. For example, organic solvents or acids may be used instead of water. As another example, other types of catalysts may be used, such as transition metals supported on various materials (e.g., oxides, carbon, etc.). Yet another example, many types of valves may be used including any isolation valve (e.g., ball, butterfly, globe, gate, needle, diaphragm) the selection of which depends on operating conditions (e.g., pressure). In another alternative, the components of the system may interact with materials simultaneously. For example, the deconstruction vessel may convert one portion of biomass to feedstock while the settling tank simultaneously permits feedstock produced by another portion of biomass to separate from the catalyst.

EXAMPLES

The system 10 described herein can be used for producing feedstocks for biofuel and biochemical manufacturing processes from biomass. The following examples describe the operation of system 10 under select conditions and are not intended to limit the scope of the invention.

Exemplary Operation of Pressurization Vessel

In one example, the biomass, catalyst and deconstruction solvent are fed into the pressurization vessel 24 while valve 62 is in the closed position. After the preferred quantity of biomass, catalyst, and deconstruction solvent are added to the pressurization vessel 24, the pressurization fluid is introduced to the pressurization vessel chamber 26 through the valve 50 to purge residual oxygen. The valve 134 is set to the open position and the deconstruction vessel 94 is depressurized through the delivery conduit 124 to facilitate product transfer to the gas separating vessel 142. The depressurization of deconstruction vessel 94 is correlated to the Cv of the valve 134 such that product transfer is in proportion to the quantity of biomass, catalyst, and deconstruction solvent introduced to the deconstruction vessel 94 from the pressurization vessel chamber 26. After the deconstruction vessel 94 is depressurized, the valve 134 is set to the closed position. Returning to the pressurization vessel 24, the valves 83 and 88 are set to the closed position to pressurize the pressurization vessel chamber 26 and the valve 56 is set to the open position to create a pressure differential between the pressurization vessel 24 and the deconstruction vessel 94. The pressure differential is preferably 10-500 psi, more preferably 100-150 psi. After the desired pressure differential is achieved, the valves 50 and 56 are closed and valve 62 is opened to allow communication between the pressurization vessel 24 and the deconstruction vessel 94 resulting in the transfer of biomass, catalyst, and deconstruction solvent from the pressurization vessel chamber 26 through the delivery conduit 60 to the deconstruction vessel 94. After a time sufficient to equalize the pressures (e.g., the pressure differential is about zero) between the pressurization vessel chamber 26 and the deconstruction vessel 94, the valve 62 is set to the closed position. Pressurizing fluid is again introduced into the pressurization vessel chamber 26. The sequence of pressurizing the pressurization vessel chamber 26 and opening the valve 62 to deliver the biomass to the deconstruction vessel 94 is repeated to facilitate complete biomass transfer and restore the operating pressure of the deconstruction vessel 94. The pressurization sequence is preferably repeated approximately one to ten times, and more preferably approximately one to five times. After a time sufficient to restore the operating pressure in the deconstruction vessel 94, the pressurization vessel chamber 26 is depressurized through the valves 83 and 88.

Exemplary Feedstock Production Results

Example 1

Figure 7:
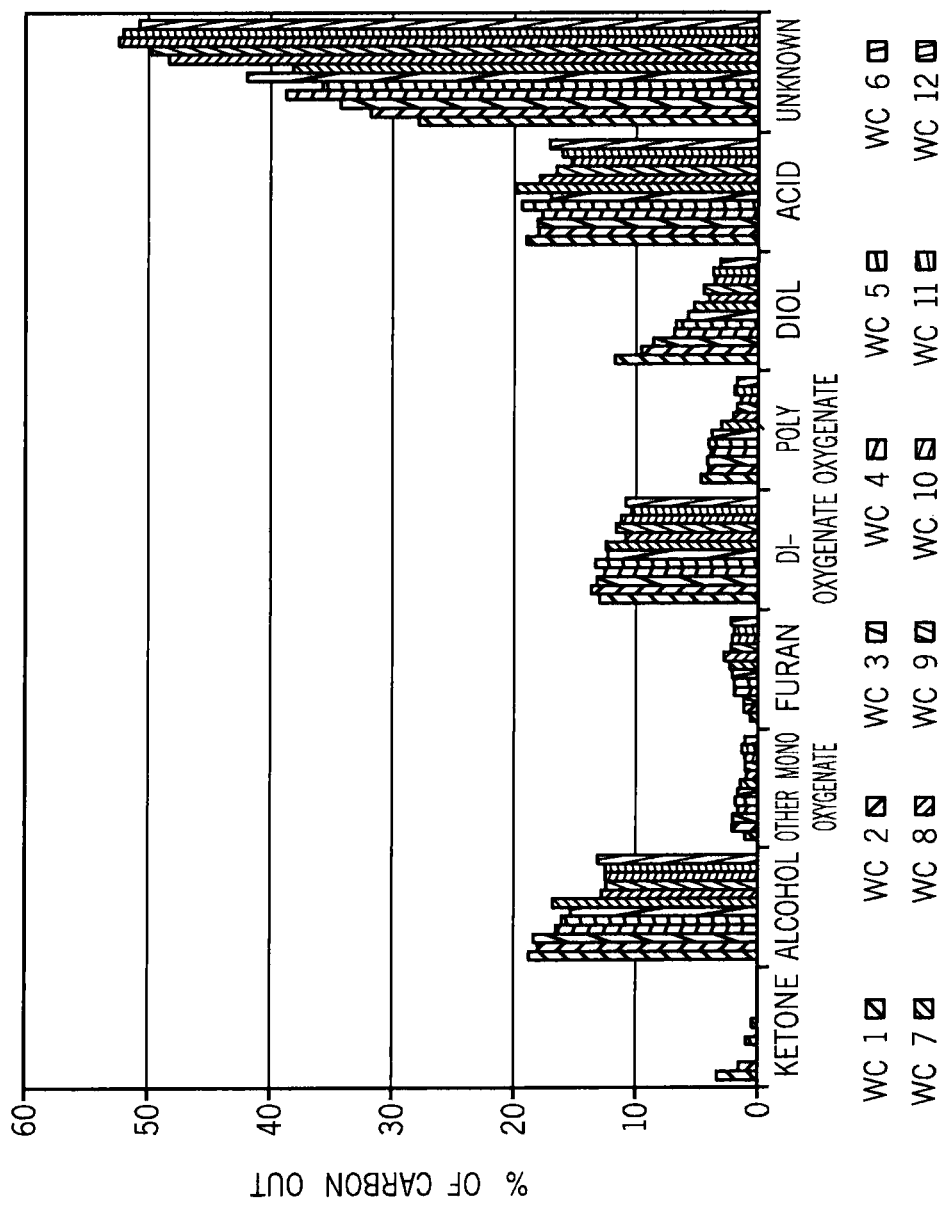
FIG. 7 is a graph providing the product yields from corn cob deconstruction according to the present invention.

The system 10 described above was used to deconstruct corn cobs and thereby produce feedstock for biofuel and biochemical manufacturing processes. In particular, hemicellulose and cellulose was extracted from the corn cobs using hot water as the solvent (provided at a rate such that the pressurization vessel 24 contained a slurry having up to 50 percent by weight of solid biomass), 5% nickel-boron (Ni:B of 1:5) on an activated carbon support as the catalyst, a deconstruction vessel 94 pressure of 1000 psig $H_2$, and a deconstruction vessel 94 temperature of 260° C. The pressurization vessel operation described above was used to achieve a pressure differential of 100 to 150 psig between the pressurization vessel chamber 26 and the deconstruction vessel 94, The system 10 achieved a maximum biomass conversion of 80 percent and a maximum feedstock production rate of 50 L/day. Tables 1A and 1B show the amount of each species (in units of grams carbon per minute based on 100 grams product per minute) produced by the corn cob deconstruction at various check points (generally three hours apart). The results are also shown in FIG. 7.

TABLE 1A

Amount of species (g C/min) at check points.

| check | ketones | alcohols | other mono-oxygenates | furans | di-oxygenates |
|---|---|---|---|---|---|
| 1 | 0.027052 | 0.152581 | 0.008592 | 0.005658 | 0.106551 |
| 2 | 0.012719 | 0.145963 | 0.017257 | 0.009536 | 0.111400 |
| 3 | 0.000000 | 0.158843 | 0.017330 | 0.010286 | 0.113788 |
| 4 | 0.000000 | 0.150958 | 0.014833 | 0.017526 | 0.115011 |
| 5 | 0.009121 | 0.147476 | 0.016669 | 0.017800 | 0.122696 |
| 6 | 0.000000 | 0.143649 | 0.015054 | 0.019819 | 0.115123 |
| 7 | 0.004405 | 0.142301 | 0.012263 | 0.020194 | 0.105737 |
| 8 | 0.000000 | 0.117519 | 0.009106 | 0.026023 | 0.099534 |
| 9 | 0.000000 | 0.111938 | 0.009473 | 0.020439 | 0.104447 |
| 10 | 0.000000 | 0.113269 | 0.009326 | 0.019468 | 0.101528 |
| 11 | 0.000000 | 0.110558 | 0.011749 | 0.017425 | 0.091797 |
| 12 | 0.000000 | 0.102363 | 0.008078 | 0.017382 | 0.084988 |

TABLE 1B

Amount of species (g C/min) at check points.

| check | poly-oxygenates | diols | acids | unknown | grams carbon |
|---|---|---|---|---|---|
| 1 | 0.038464 | 0.095691 | 0.154975 | 0.227956 | 0.817519 |
| 2 | 0.032969 | 0.078265 | 0.145369 | 0.258853 | 0.812331 |
| 3 | 0.036008 | 0.074318 | 0.155551 | 0.295079 | 0.861203 |
| 4 | 0.035340 | 0.062923 | 0.161845 | 0.353174 | 0.911612 |
| 5 | 0.037702 | 0.061632 | 0.178373 | 0.328672 | 0.920142 |
| 6 | 0.035109 | 0.053528 | 0.158727 | 0.391103 | 0.932111 |
| 7 | 0.025556 | 0.044299 | 0.168163 | 0.323615 | 0.846534 |
| 8 | 0.019073 | 0.036822 | 0.164211 | 0.442232 | 0.914520 |
| 9 | 0.015715 | 0.040543 | 0.148513 | 0.448771 | 0.899839 |
| 10 | 0.013565 | 0.033006 | 0.138321 | 0.473387 | 0.901871 |
| 11 | 0.016876 | 0.032854 | 0.141943 | 0.460494 | 0.883695 |
| 12 | 0.013645 | 0.024427 | 0.134446 | 0.398099 | 0.783428 |

Table 2 shows the components in the feedstock at the first check point using a gas chromatograph.

TABLE 2

Feedstock components at the first check point.

| name | CAS number | composition (weight percent) | molecular weight (u) | output (grams/minute) | output (grams carbon/minute) |
|---|---|---|---|---|---|
| acetone | 67 - 64 - 1 | 0.0436 | 58.0748 | 0.0436 | 0.0271 |
| methyl propionate | 554 - 12 - 1 | 0.0159 | 88.0958 | 0.0159 | 0.0087 |
| (R)-(−)-2-pentanol | 31087 - 44 - 2 | 0.0278 | 88.1446 | 0.0278 | 0.0189 |
| cyclopentanone, 2-methyl- | 1120 - 72 - 5 | 0.0117 | 98.1397 | 0.0117 | 0.0086 |
| 1-pentanol, 2-methyl- | 105 - 30 - 6 | 0.0062 | 102.1716 | 0.0062 | 0.0044 |
| acetol | 116 - 09 - 6 | 0.2012 | 74.0688 | 0.2012 | 0.0979 |
| 2,6-dimethyl-4-heptanol | 108 - 82 - 7 | 0.0091 | 144.2524 | 0.0091 | 0.0068 |
| 1-hexanol | 111 - 27 - 3 | 0.1736 | 102.1716 | 0.1736 | 0.1224 |
| butyl lactate | 138 - 22 - 7 | 0.0066 | 146.1706 | 0.0066 | 0.0038 |
| iso-butyric acid | 79 - 31 - 2 | 0.0037 | 88.0958 | 0.0037 | 0.0020 |
| 5-(hydroxymethyl) furfural | 67 - 47 - 0 | 0.0099 | 126.0958 | 0.0099 | 0.0057 |
| acetic acid | 64 - 19 - 7 | 0.1288 | 60.0419 | 0.1288 | 0.0516 |
| propionic acid | 79 - 09 - 4 | 0.0413 | 74.0688 | 0.0413 | 0.0201 |
| butanoic acid | 107 - 92 - 6 | 0.1434 | 88.0958 | 0.1434 | 0.0782 |
| 2,3-butanediol | 24347 - 58 - 8 | 0.0041 | 90.1117 | 0.0041 | 0.0022 |
| 2,3-butanediol | 24347 - 58 - 8 | 0.0115 | 90.1117 | 0.0115 | 0.0061 |
| 1,2-butanediol | 584 - 03 - 2 | 0.0095 | 90.1117 | 0.0095 | 0.0051 |
| formic acid | 64 - 18 - 6 | 0.0118 | 46.0149 | 0.0118 | 0.0031 |
| ethylene glycol | 107 - 21 - 1 | 0.1036 | 62.0578 | 0.1036 | 0.0401 |
| propylene glycol | 57 - 55 - 6 | 0.0667 | 76.0848 | 0.0667 | 0.0316 |
| lactic acid | 50 - 21 - 5 | 0.0139 | 90.0628 | 0.0139 | 0.0055 |
| 1,2-pentanediol | 5343 - 92 - 0 | 0.0184 | 104.1386 | 0.0184 | 0.0106 |
| glycerol | 56 - 81 - 5 | 0.0227 | 92.0788 | 0.0227 | 0.0089 |
| threitol | 2319 - 57 - 5 | 0.0055 | 122.0997 | 0.0055 | 0.0022 |
| arabinose | 147 - 81 - 9 | 0.0095 | 150.1047 | 0.0095 | 0.0038 |
| xylitol | 87 - 99 - 0 | 0.0189 | 152.1206 | 0.0189 | 0.0075 |
| arabitol | 6018 - 27 - 5 | 0.0041 | 152.1206 | 0.0041 | 0.0016 |
| mannitol | 69 - 65 - 8 | 0.0032 | 182.1416 | 0.0032 | 0.0013 |
| sorbitol | 50 - 70 - 4 | 0.0099 | 182.1416 | 0.0099 | 0.0039 |

Example 2

The system 10 described above was used to deconstruct loblolly pine and thereby produce feedstock for biofuel and biochemical manufacturing processes. A catalyst, 2% Pd 2% Ag on tungstated zirconia support, was used for deconstruction of loblolly pine. Reactor conditions were 10% (w/v) loblolly pine slurry in water, 1:3 catalyst:pine, 260° C., 1000 psi $H_2$. A fresh catalyst sample was used for deconstruction, the spent catalyst was then regenerated and used again.

Figure 8:
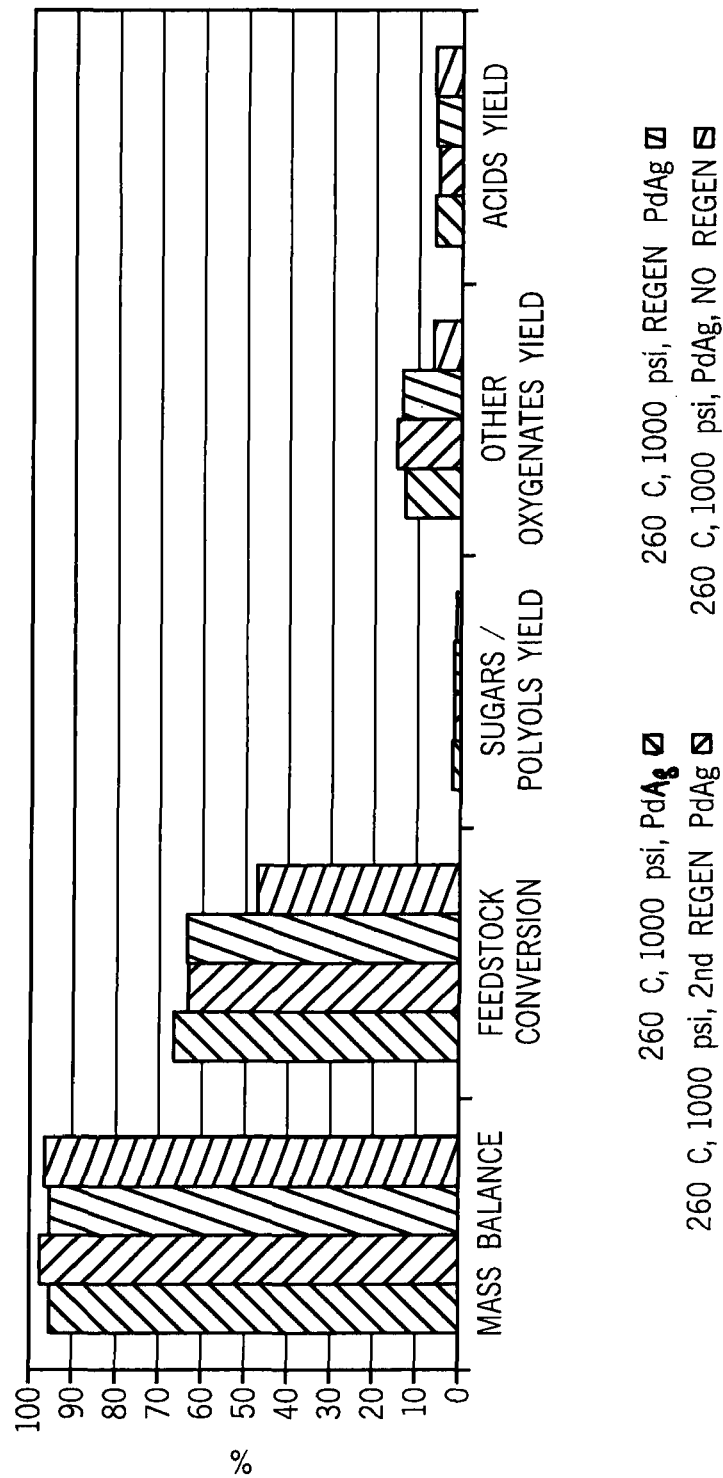
FIG. 8 is a graph providing conversion data for loblolly pine according to the present invention.
Figure 9:
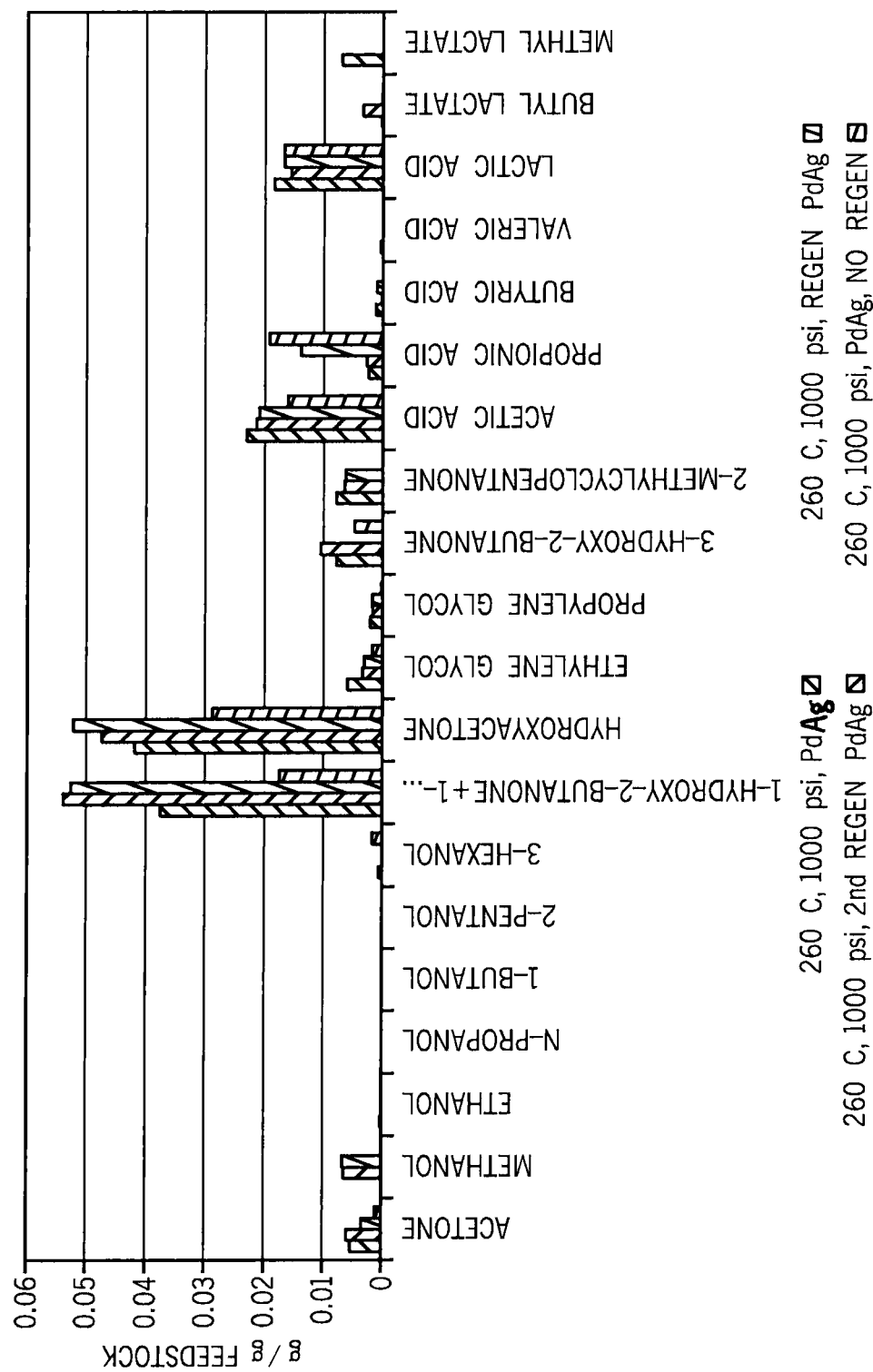
FIG. 9 is a graph providing the product yields from the conversion of loblolly pine according to the present invention.

Regeneration included an organic solvent wash, followed by several water washings to remove residual solvent and an oxidative regeneration. The oxidative regeneration conditions were as follows: 0.8° C. per minute ramp to 450° C. followed by a 16 hour hold at temperature, with a gas flow of 1000 ml/min $N_2$ and 3% oxygen. The spent catalyst was again collected and regenerated a second time as described above. The catalyst was used after the second regeneration and the spent catalyst was collected. A final run was then conducted using the spent catalyst without any regeneration. Conversion and product selectivity of loblolly pine are shown in FIGS. 8 and 9, respectively.

Example 3

Figure 10:
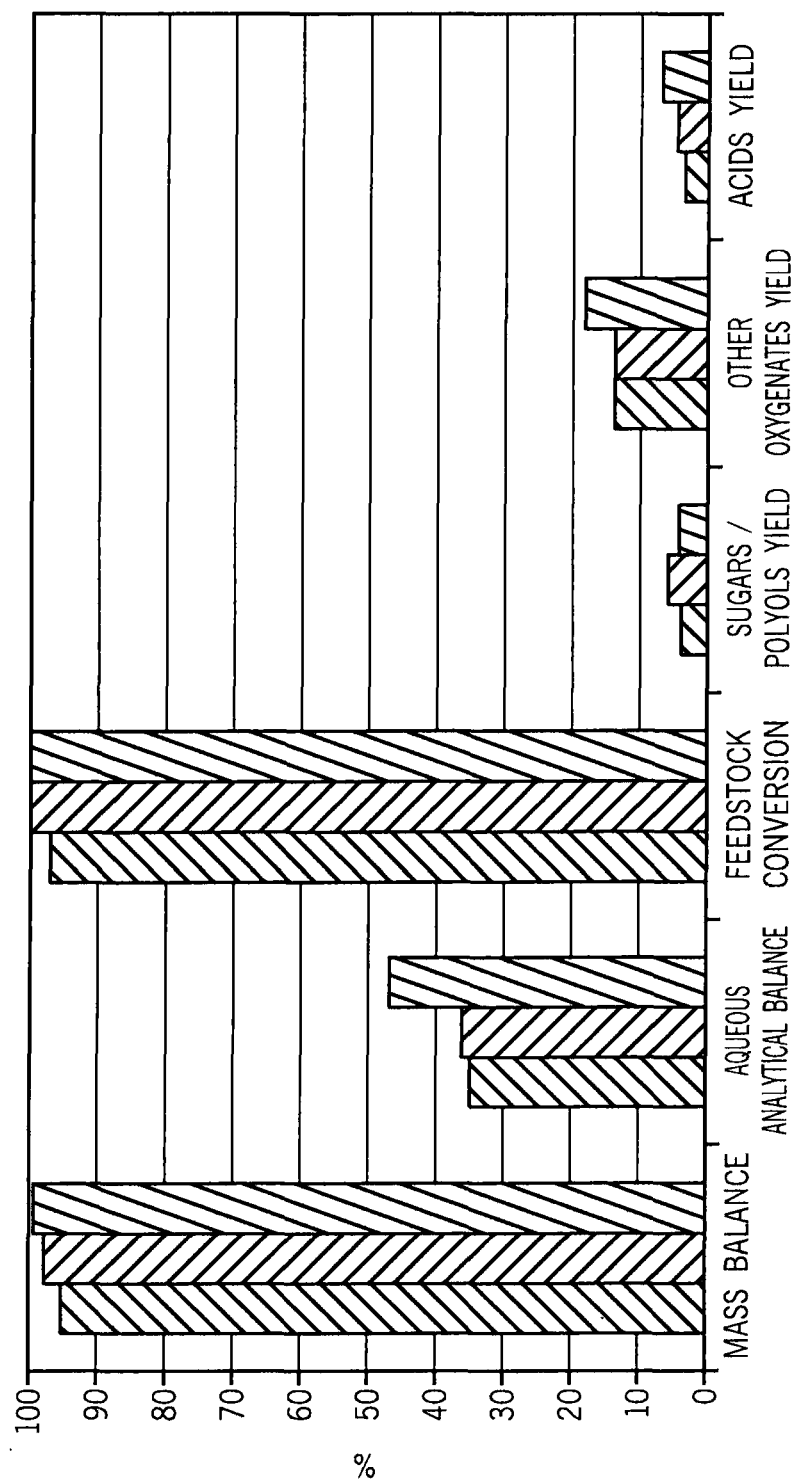
FIG. 10 is a graph providing conversion data for MCC according to the present invention.
Figure 11:
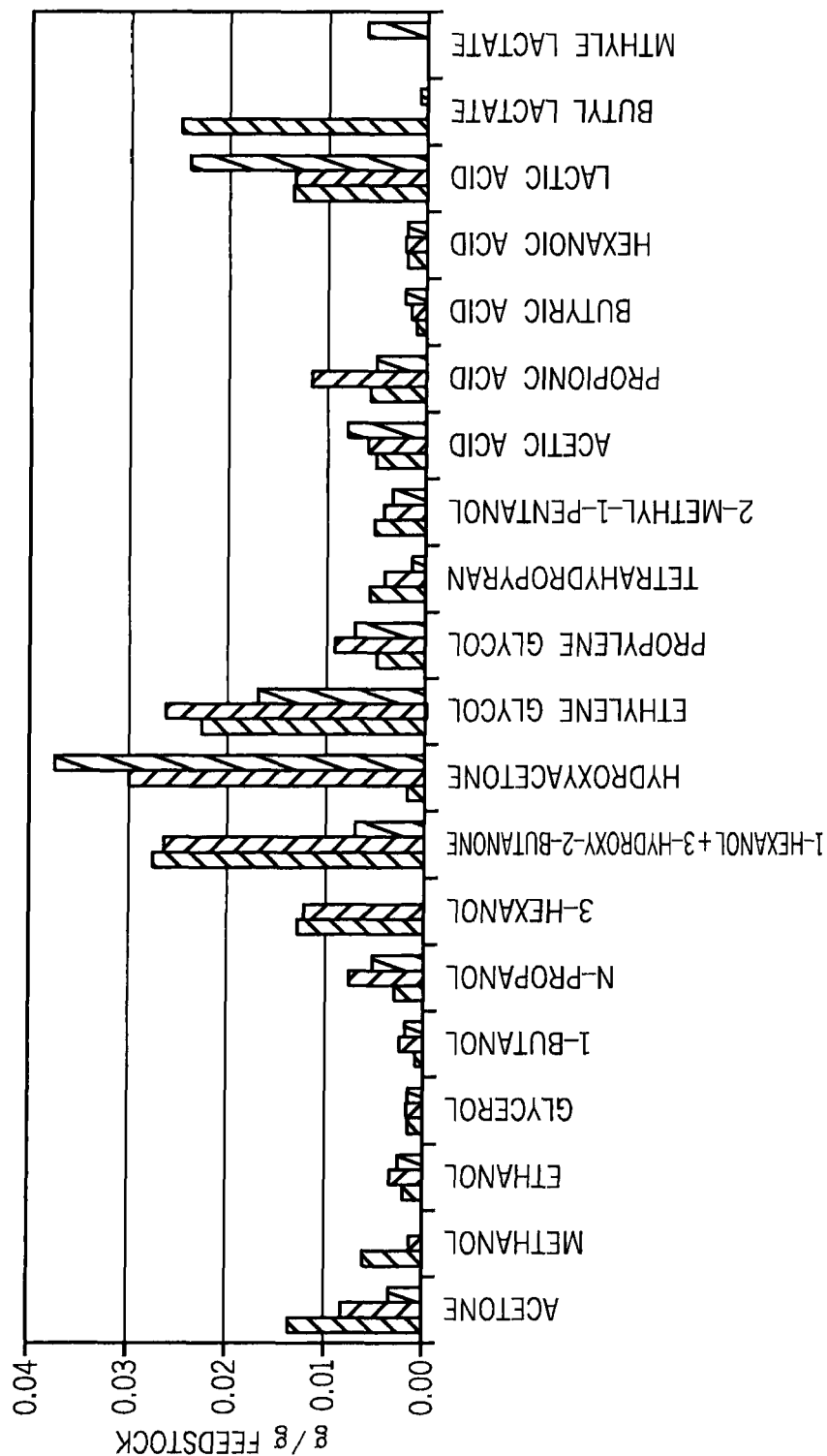
FIG. 11 is a graph providing the product yields from the conversion of MCC according to the present invention.

The system 10 described above was used to deconstruct microcrystalline cellulose (MCC) and thereby produce feedstock for biofuel and biochemical manufacturing processes. A catalyst, 2% Pd 2% Ag on tungstated zirconia support, was used for deconstruction of MCC. Reactor conditions were 10% (w/v) MCC slurry in water, 1:3 catalyst:MCC, 260° C., 1000 psi $H_2$. A fresh catalyst sample was used for deconstruction, the spent catalyst was then regenerated and used again. Regeneration included an organic solvent wash, followed by several water washings to remove residual solvent and an oxidative regeneration. The oxidative regeneration conditions were as follows: 0.8° C. per minute ramp to 450° C. followed by a 16 hour hold at temperature, with a gas flow of 1000 ml/min $N_2$ and 3% oxygen. The spent catalyst was again collected and regenerated a second time as described above. The catalyst was used after the second regeneration and the spent catalyst was collected. A final run was then conducted using the spent catalyst without any regeneration. Conversion and product selectivity of MCC are shown in FIGS. 10 and 11, respectively.

Example 4

The system 310 described above was used to deconstruct corn stover and thereby produce feedstock for biofuel and biochemical manufacturing processes. A catalyst, 2% Pd 2% Ru 13.5% W on monoclinic zirconia support, was used for deconstruction of corn stover with water as the initial solvent followed by recycle of the aqueous stream. The pressurization vessel operation described above was used to achieve a pressure differential of 100 to 150 psig between the pressurization vessel chamber 26 and the deconstruction vessel 94, Reactor conditions were 10% (w/v) water washed corn stover in water, 1:3 catalyst:corn stover, 250° C.-285° C., 950 psi-1100 psi $H_2$. Fresh catalyst was used for the first two rounds of recycle followed by catalyst regeneration for rounds three and four. The catalyst was regenerated according to the conditons outlined in Table 3.

Figure 12:
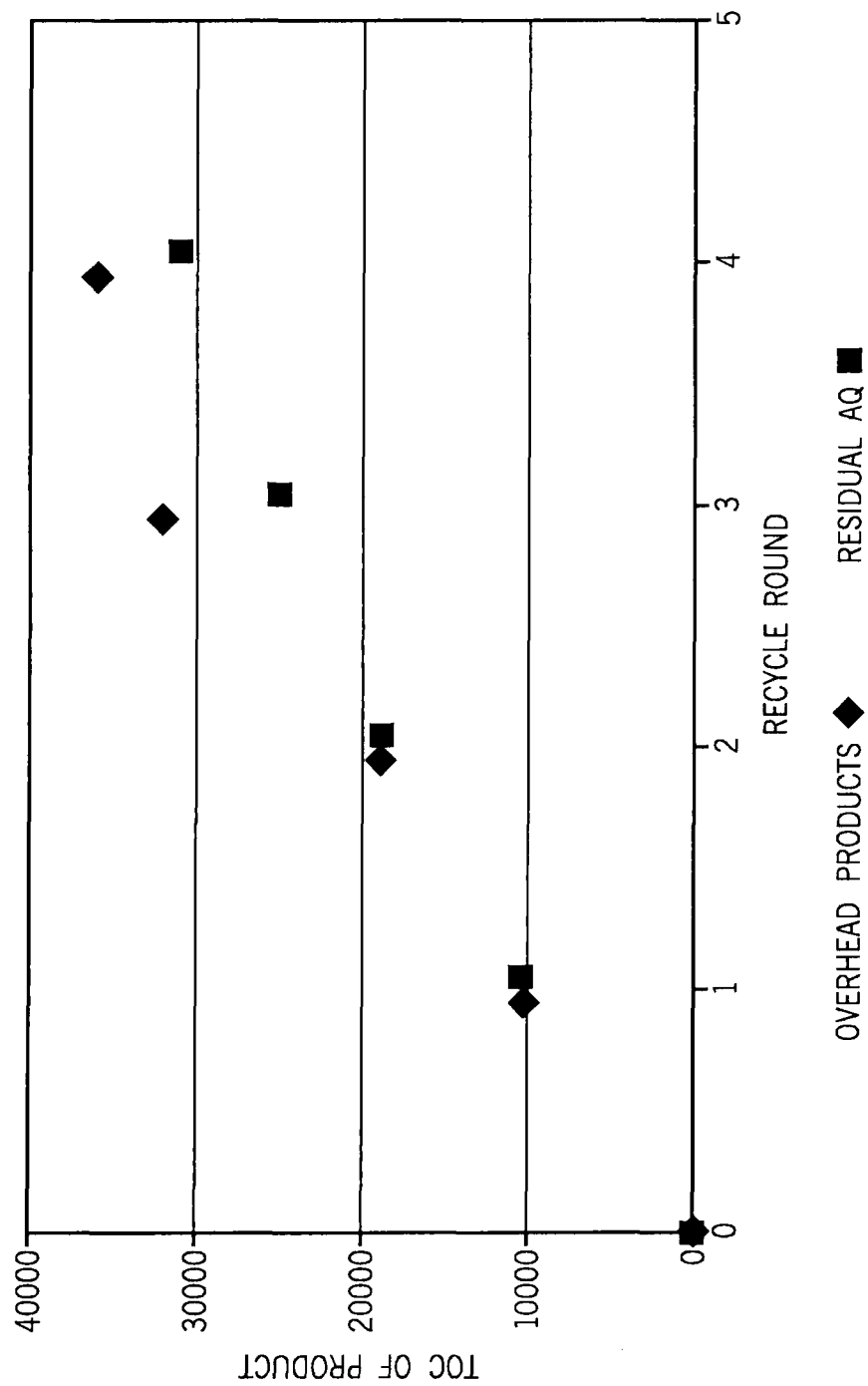
FIG. 12 is a graph providing the total organic carbon from the conversion of corn stover with recycle according to the present invention.
Figure 13:
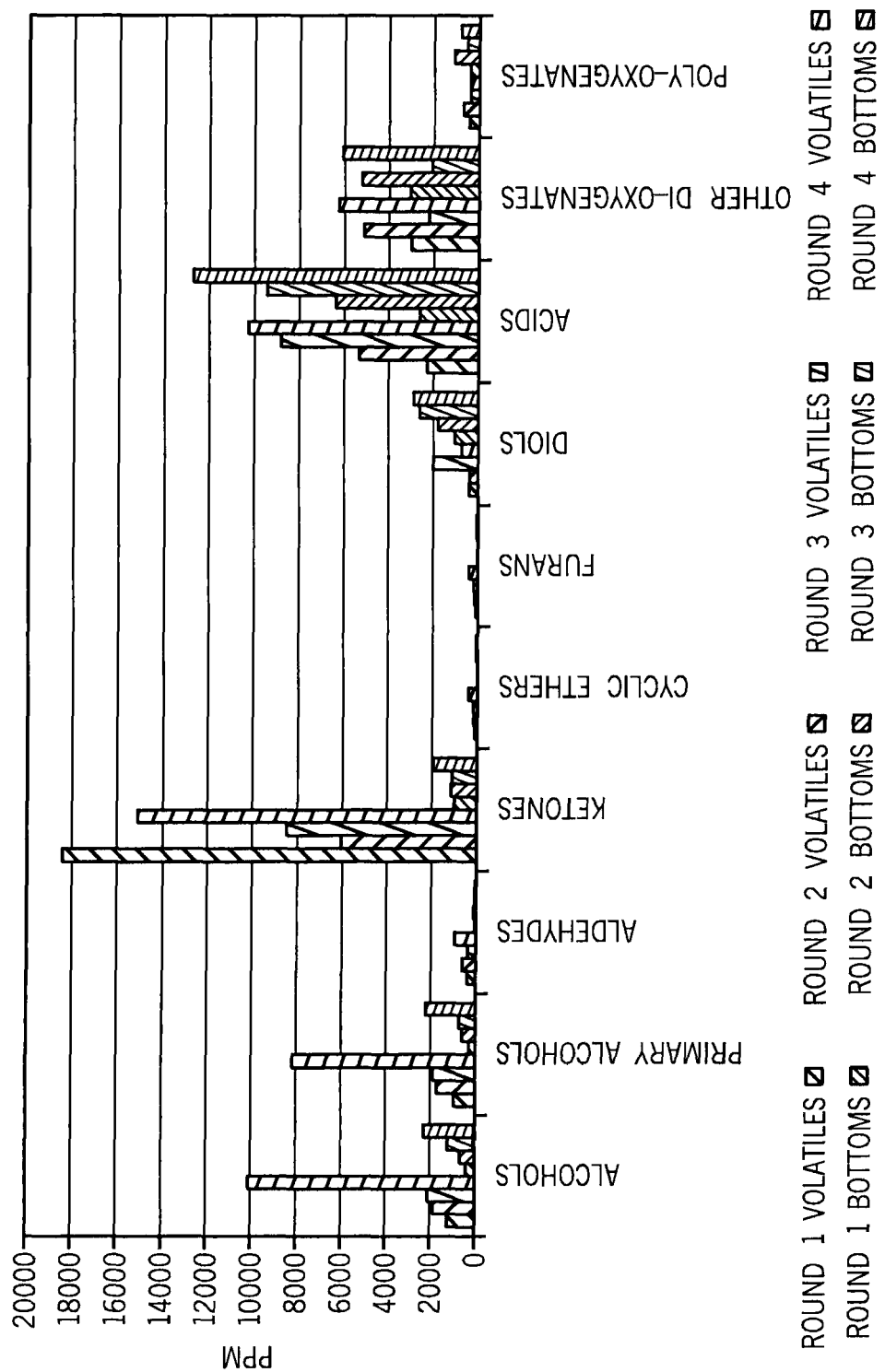
FIG. 13 is a graph providing the product distribution of the volatiles and bottoms from the conversion of corn stover with recycle according to the present invention.

FIG. 12 illustrates the affect of aqueous recycle on total organic carbon (TOC) in the product stream. FIG. 13 illustrates the affect of aqueous recycle on the product distribution in both the volatile and bottom fractions.

Example 5

Figure 14:
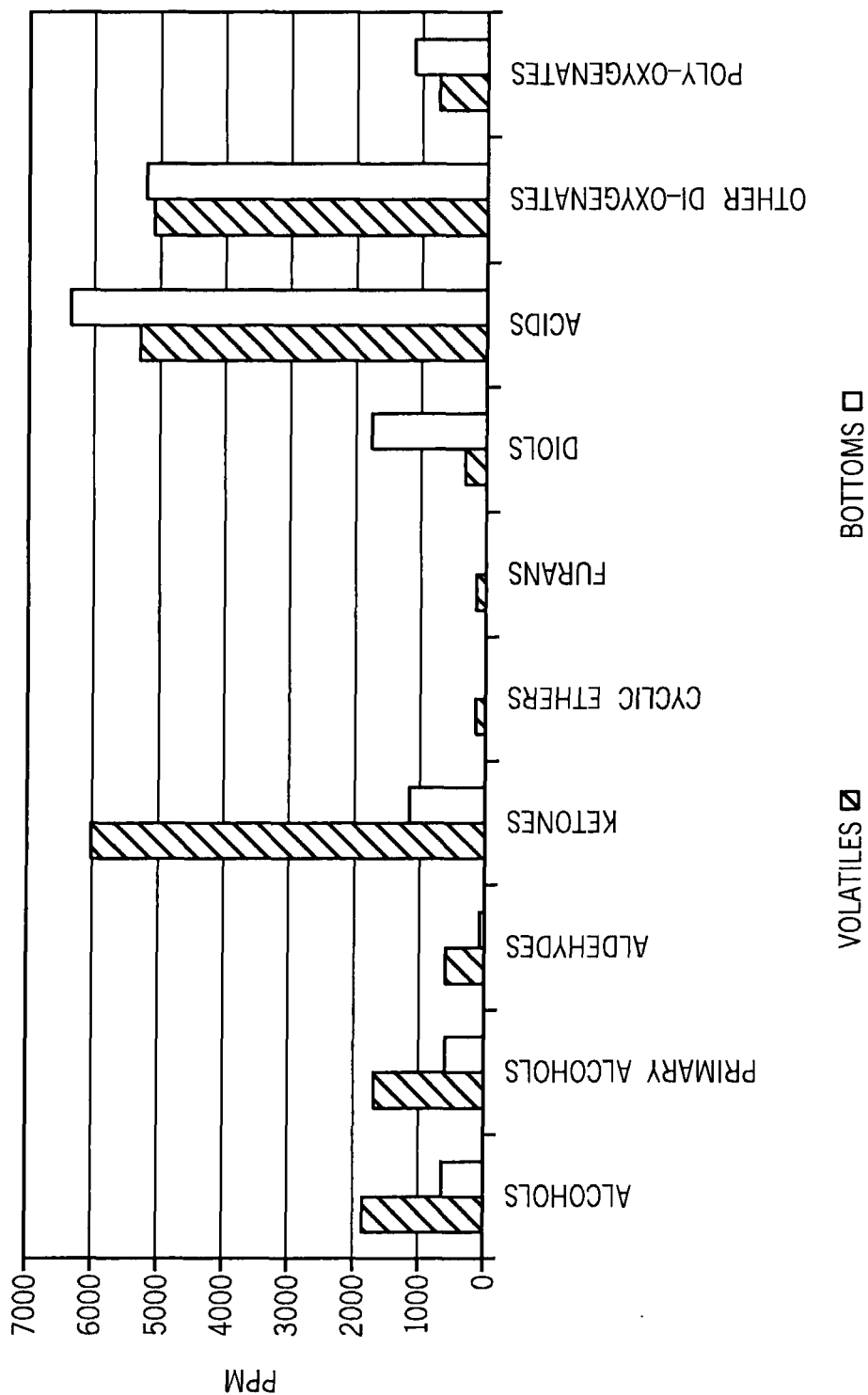
FIG. 14 is a graph providing the product distribution of the aqueous phase (volatiles and bottoms) from the conversion of sucrose according to the present invention.
Figure 15:
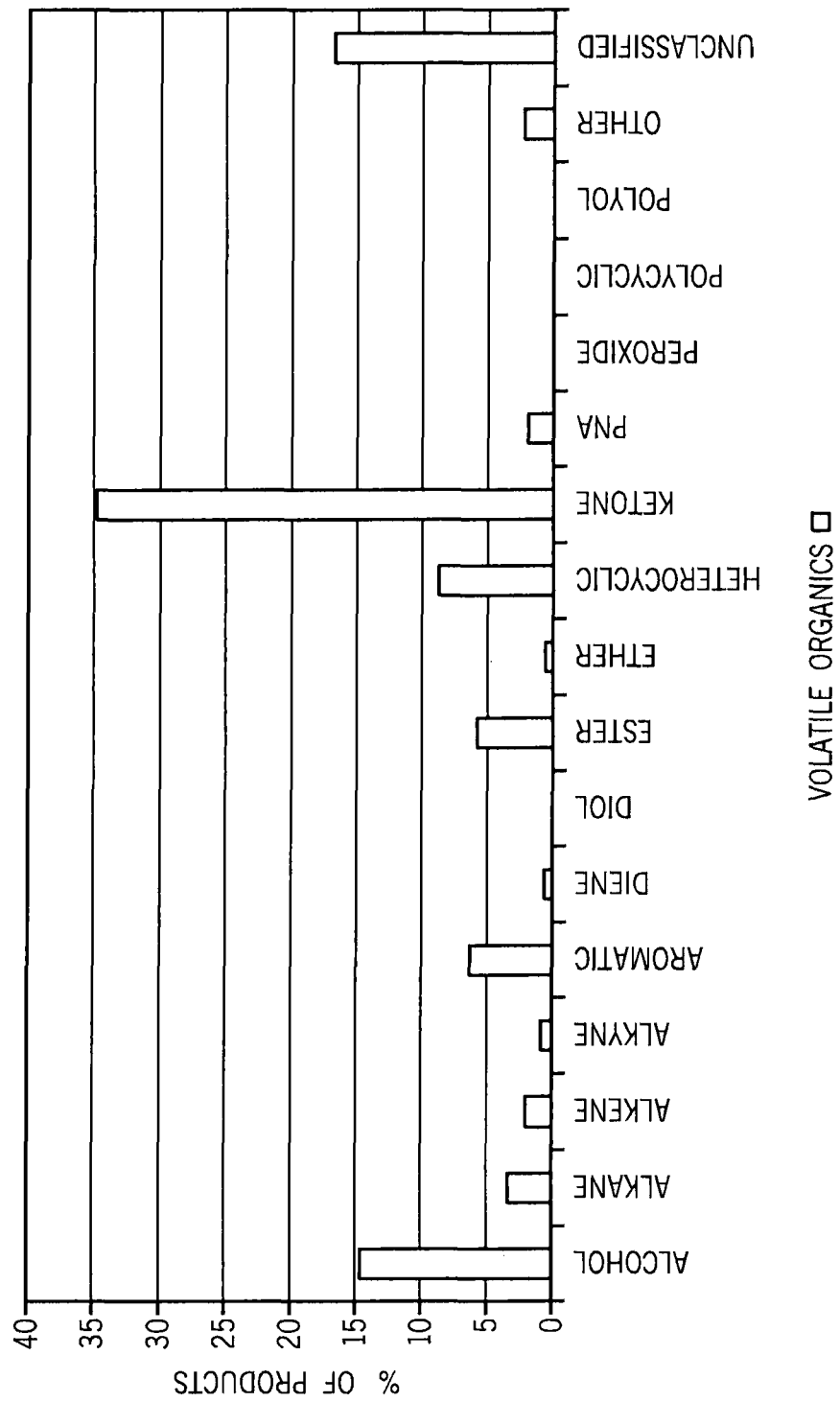
FIG. 15 is a graph providing the product distribution of the organic phase from the conversion of sucrose according to the present invention.

The system 10 described above was used to deconstruct sucrose and thereby produce feedstock for biofuel and biochemical manufacturing processes. A catalyst, 2% Pd 2% Ru 13.5% W on monoclinic zirconia support, was used for deconstruction of sucrose. The pressurization vessel operation described above was used to achieve a pressure differential of 100 to 150 psig between the pressurization vessel chamber 26 and the deconstruction vessel 94, Reactor conditions were 60% (w/v) sucrose in water, about 1:4 catalyst: sucrose, 240° C.-290° C., 1000 psi $H_2$. Operating under the conditions outlined above 100% of the sucrose was converted to products in aqueous and organic phases. FIGS. 14 and 15 illustrate the product distribution in the aqueous and organic phases, respectively.

Example 6

The system 310 described above was used to deconstruct corn stover and thereby produce feedstock for biofuel and biochemical manufacturing processes. A catalyst, 2% Pd 2% Ru 13.5% W on monoclinic zirconia support, was used for deconstruction of corn stover with 60% (w/v) corn syrup in water as the initial solvent followed by recycle of the aqueous stream. The pressurization vessel operation described above was used to achieve a pressure differential of 100 to 150 psig between the pressurization vessel chamber 26 and the deconstruction vessel 94, Reactor conditions were 10% (w/v) water washed corn stover in water, 1:3 catalyst:corn stover, 250° C.-285° C., 950 psi-1100 psi $H_2$. Fresh catalyst was used for the first two rounds of recycle followed by catalyst regeneration for rounds three and four. The catalyst was regenerated according to the conditons outlined in Table 3.

Figure 16:
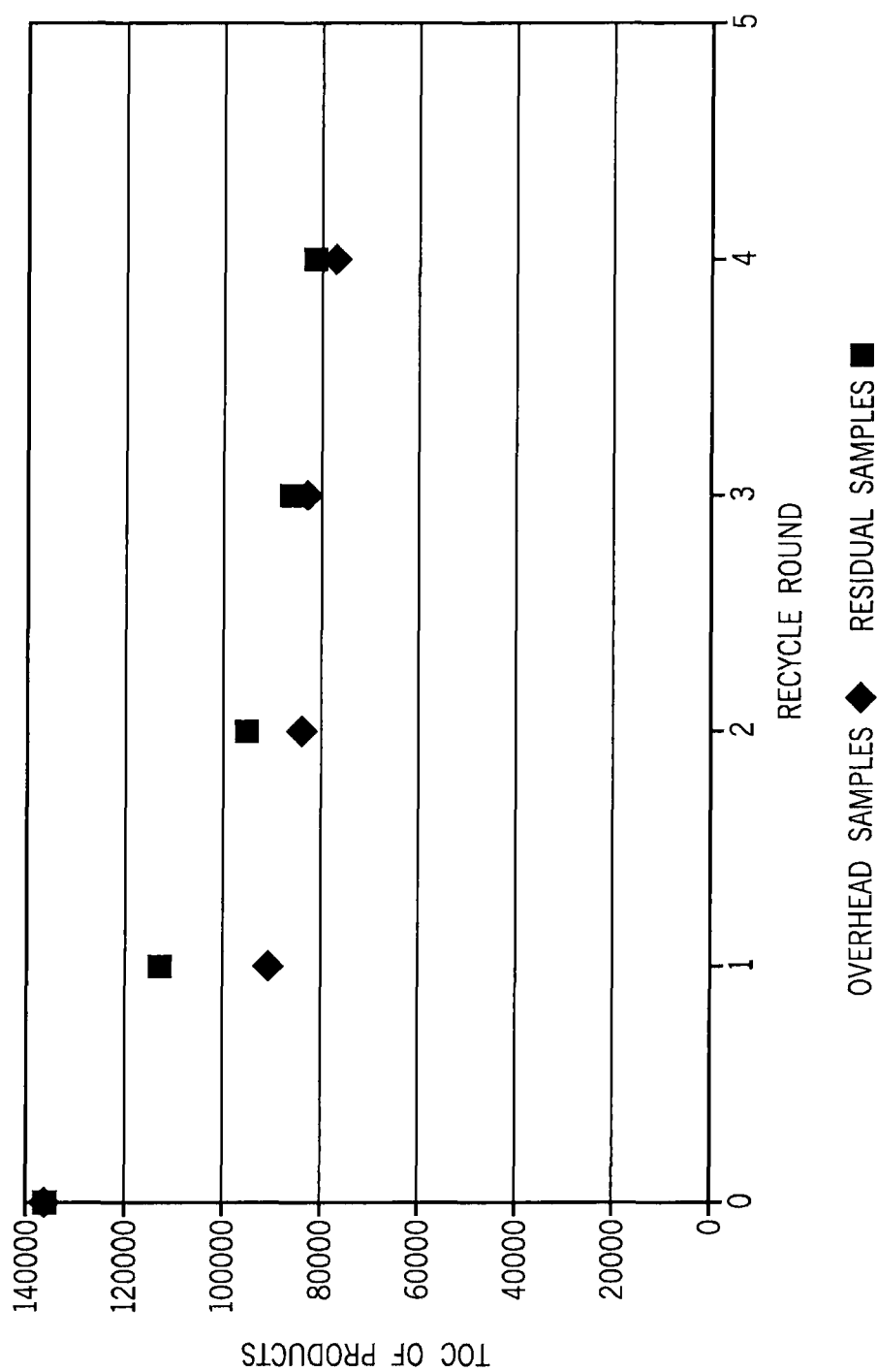
FIG. 16 is a graph providing the total organic carbon from the conversion of corn stover with recycle according to the present invention.
Figure 17:
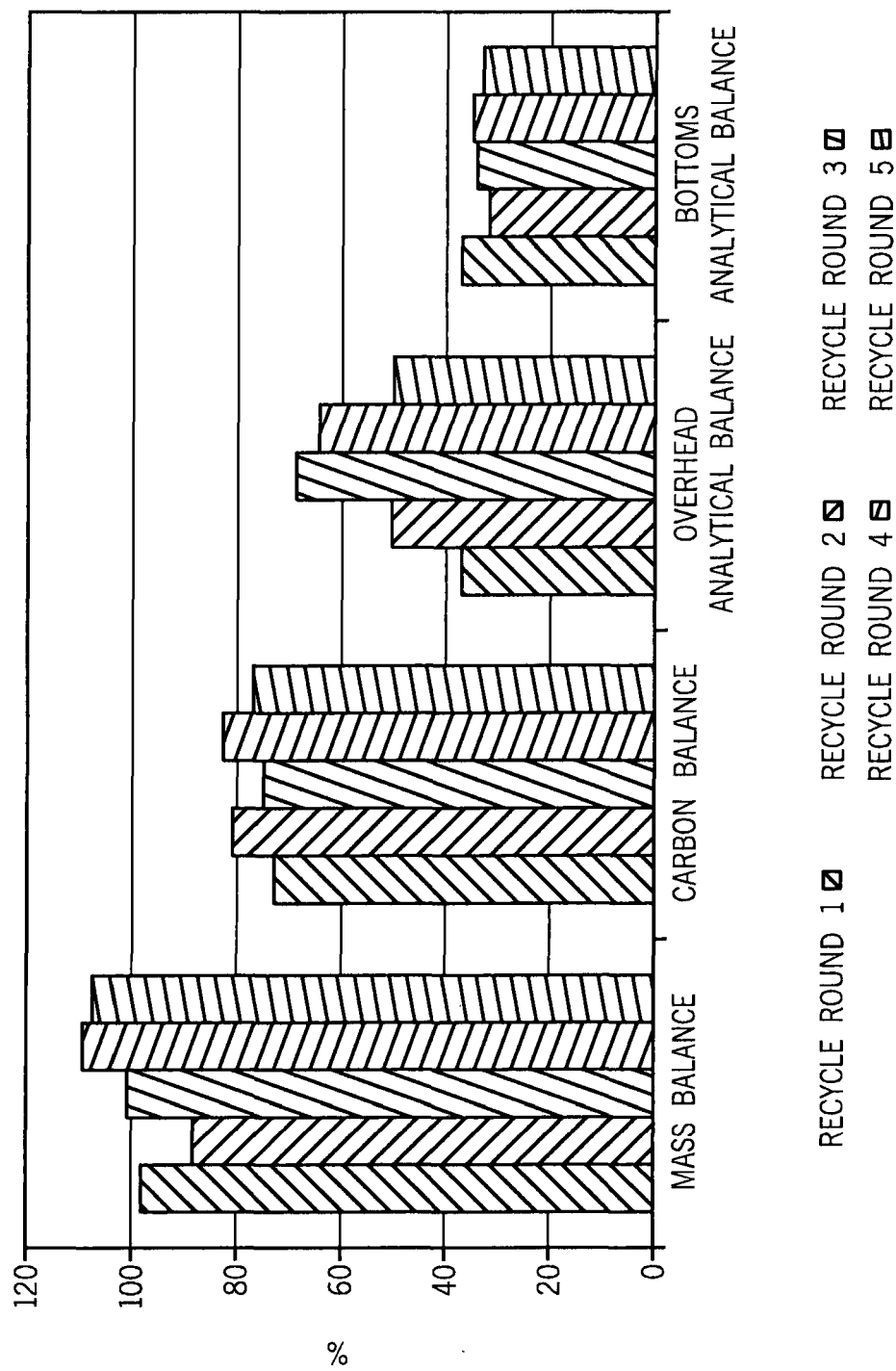
FIG. 17 is a graph providing the overall balances for the conversion of corn stover with aqueous phase recycle according to the present invention.
Figure 18:
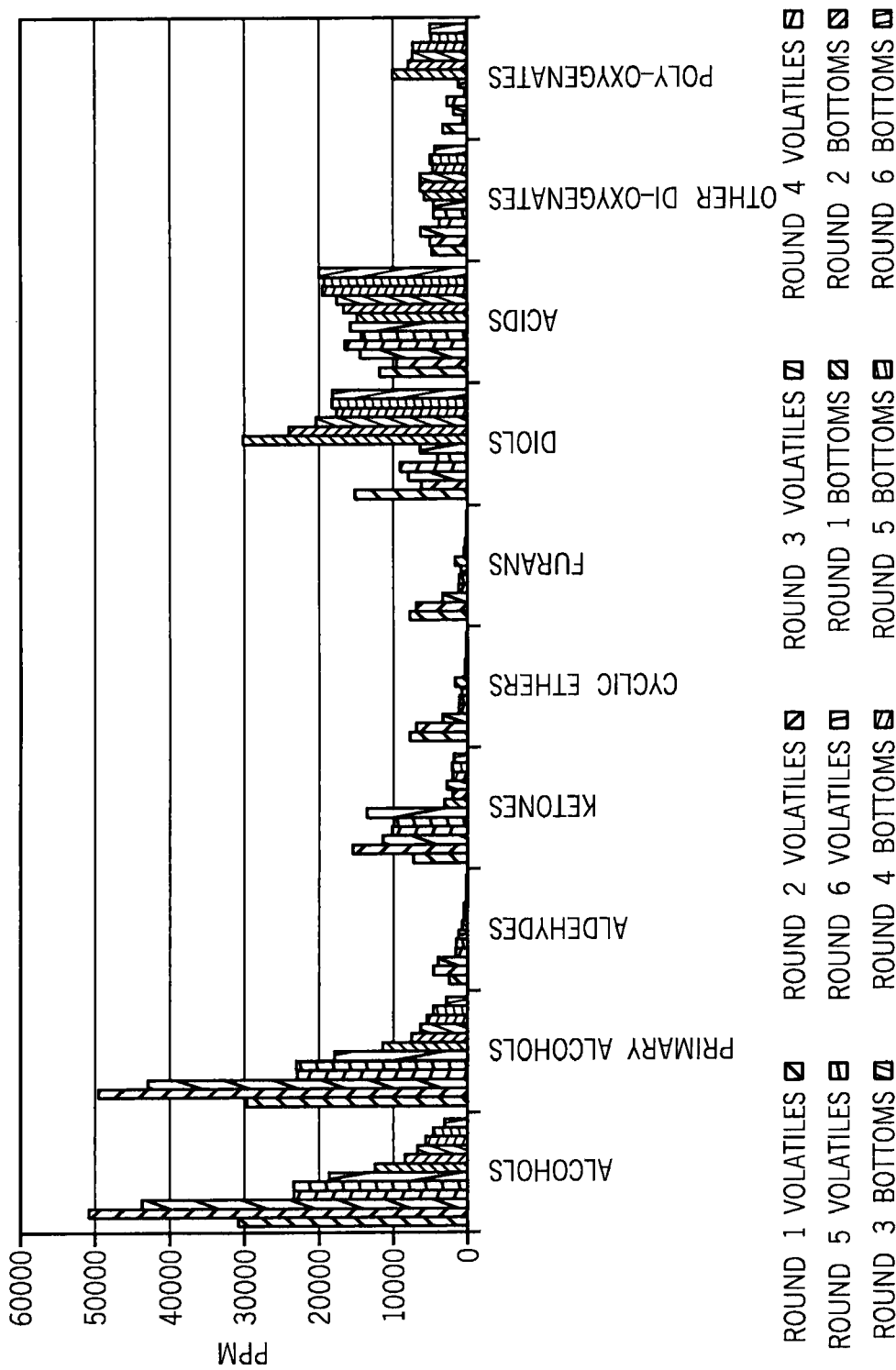
FIG. 18 is a graph providing the product distribution of the volatiles and bottoms from the conversion of corn stover with recycle according to the present invention.
Figure 19:
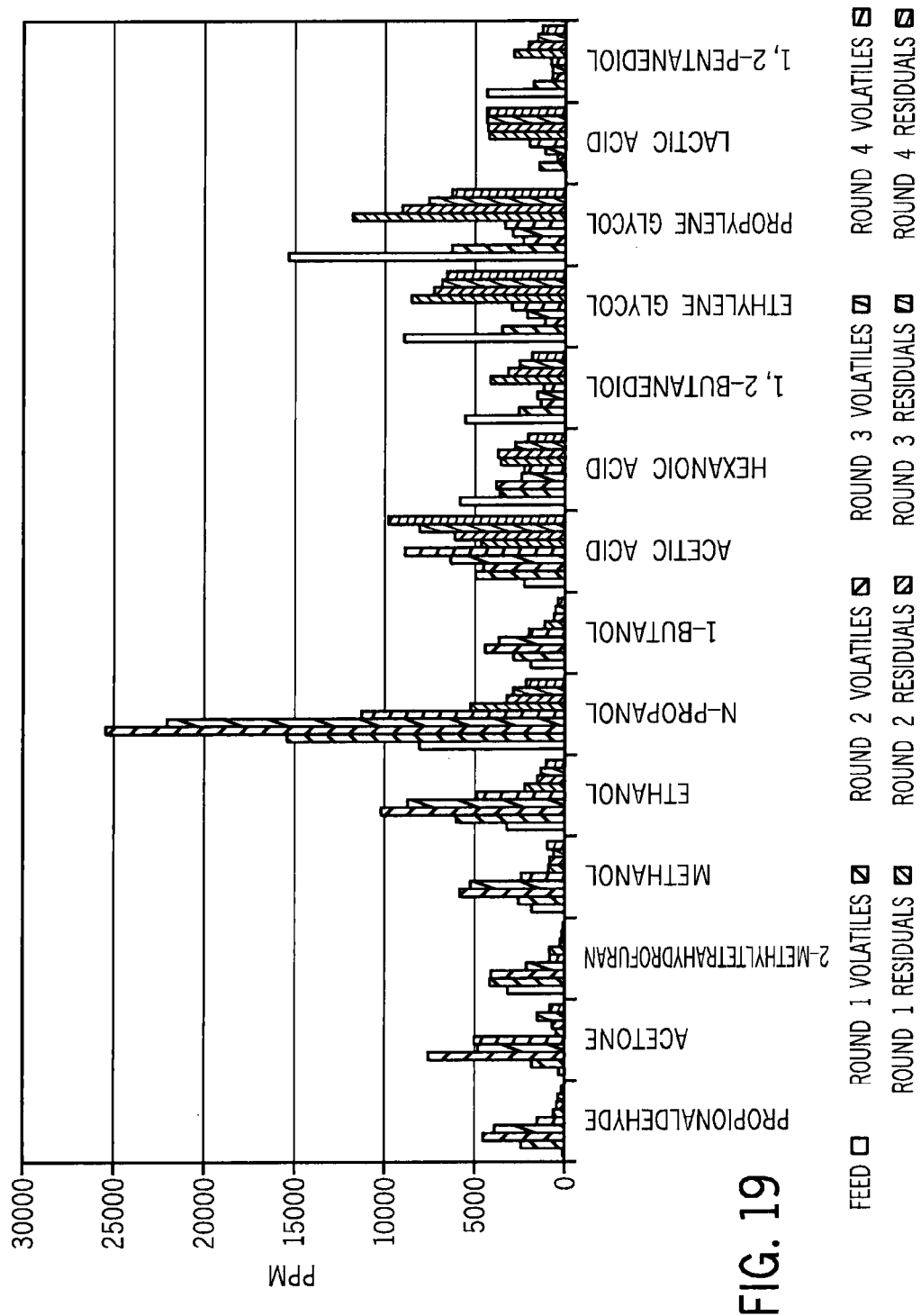
FIG. 19 is a graph providing the product speciation of the aqueous phase from corn stover with recycle according to the present invention.

FIG. 16 illustrates the affect of aqueous recycle on total organic carbon (TOC) in the aqueous product stream. FIG. 17 illustrates the overall balances from the recycle of aqueous products. FIG. 18 illustrates the affect of aqueous recycle on the product distribution in both the volatile and bottom fractions, specifically the deoxygenated compounds in the volatile fraction and the diols and poly-oxygenates in the bottoms (used as the recycle solvent). FIG. 19 illustrates the product speciation of the aqueous phase including specific compounds and the increase in TOC over time.

Example 7

The system 10 described above was used to deconstruct microcrystalline celulose (MCC) and thereby produce feedstock for biofuel and biochemical manufacturing processes.

TABLE 3

Catalyst preparation, reduction, passivation, and regeneration.

| Catalyst #FCC78 | Calcination | Reduction | Passivation | Regeneration |
|---|---|---|---|---|
| Flowing Gas | Air | H2 | <3% O2 in N2 Environment | <3% O2 in N2 Environment |
| Temperature | 400° C. | 350° C. | <35° C. | 450° C. |
| Ramp | 1.6° C./min | 2.7° C./min | N/A | 1.25° C./min |
| Soak | 6 hrs | 2 hrs | 2 hrs | 16 hrs |

Figure 20:
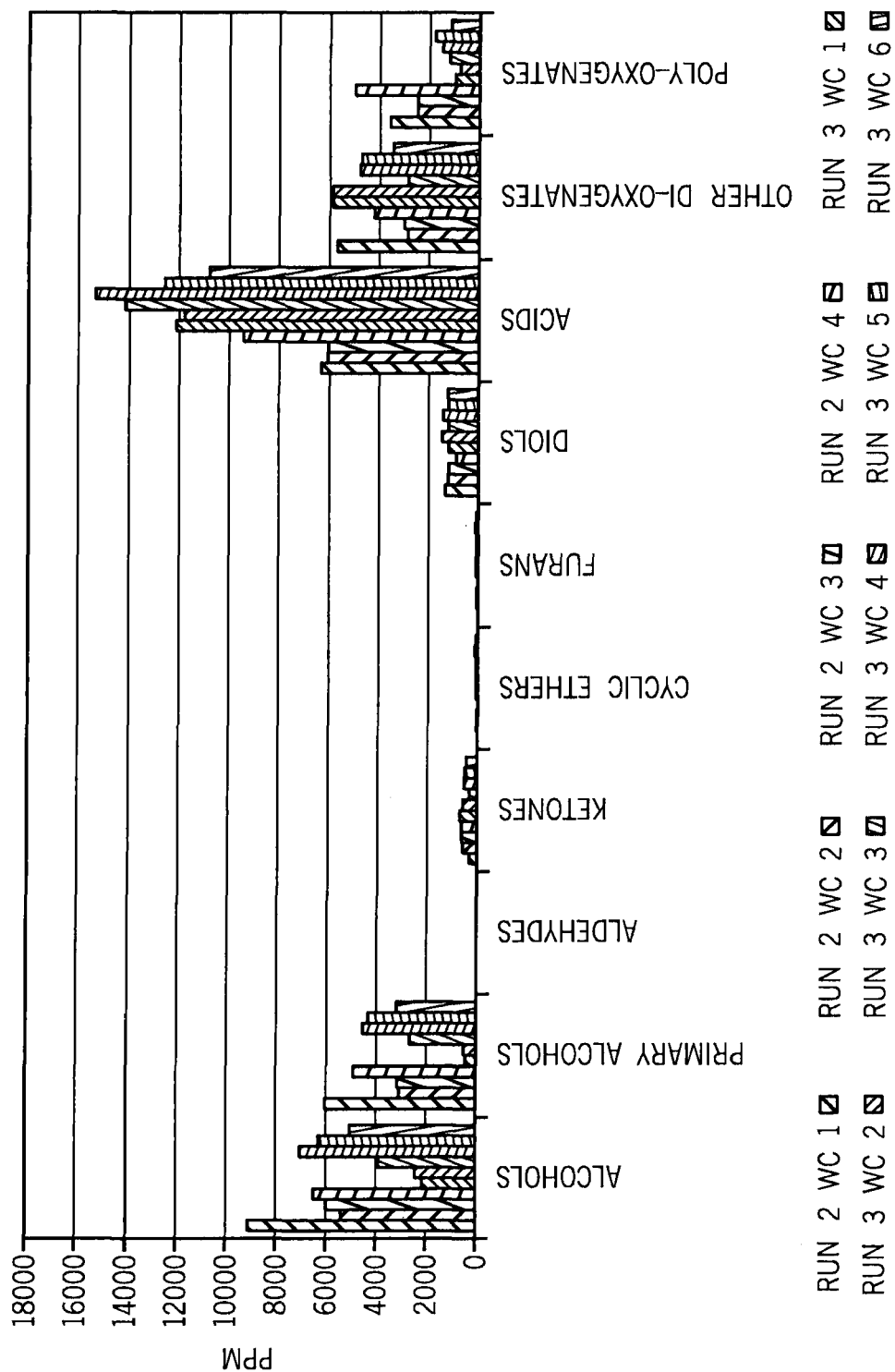
FIG. 20 is a graph providing the product distribution from the deconstruction of MCC under two different processing conditions according to the present invention.
Figure 21:
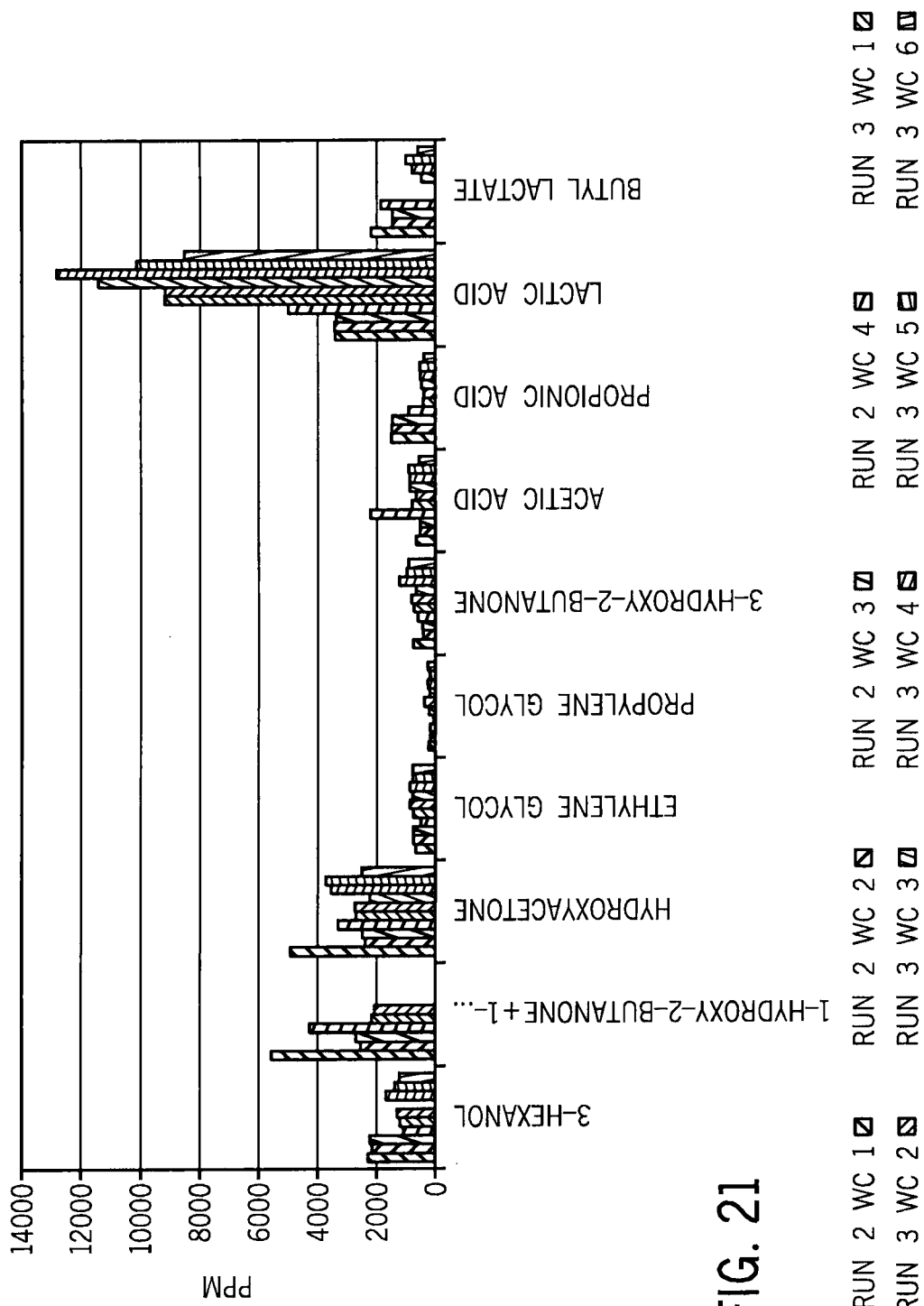
FIG. 21 is a graph providing the product speciation from the deconstruction of MCC under two different processing conditions according to the present invention.

A catalyst, 2% Pd 2% Ag on tungstated zirconia support, was used for deconstruction of MCC. The pressurization vessel operation described above was used to achieve a pressure differential of 100 to 150 psig between the pressurization vessel chamber 26 and the deconstruction vessel 94, Reactor conditions were 10% (w/v) MCC in water, 1:3 catalyst:MCC, 240° C.-285° C. (Run 2 240° C.-275° C., Run 3 260° C.-285° C.), 950 psi-1050 psi $H_2$. Fresh catalyst was used for Run 2 with a combination of fresh catalyst and regenerated catalyst used for Run 3 at a fresh:regenerated catalyst ratio of 1:1. Product distribution and speciation are summarized in FIGS. 20 and 21, respectively.

Example 8

Figure 22:
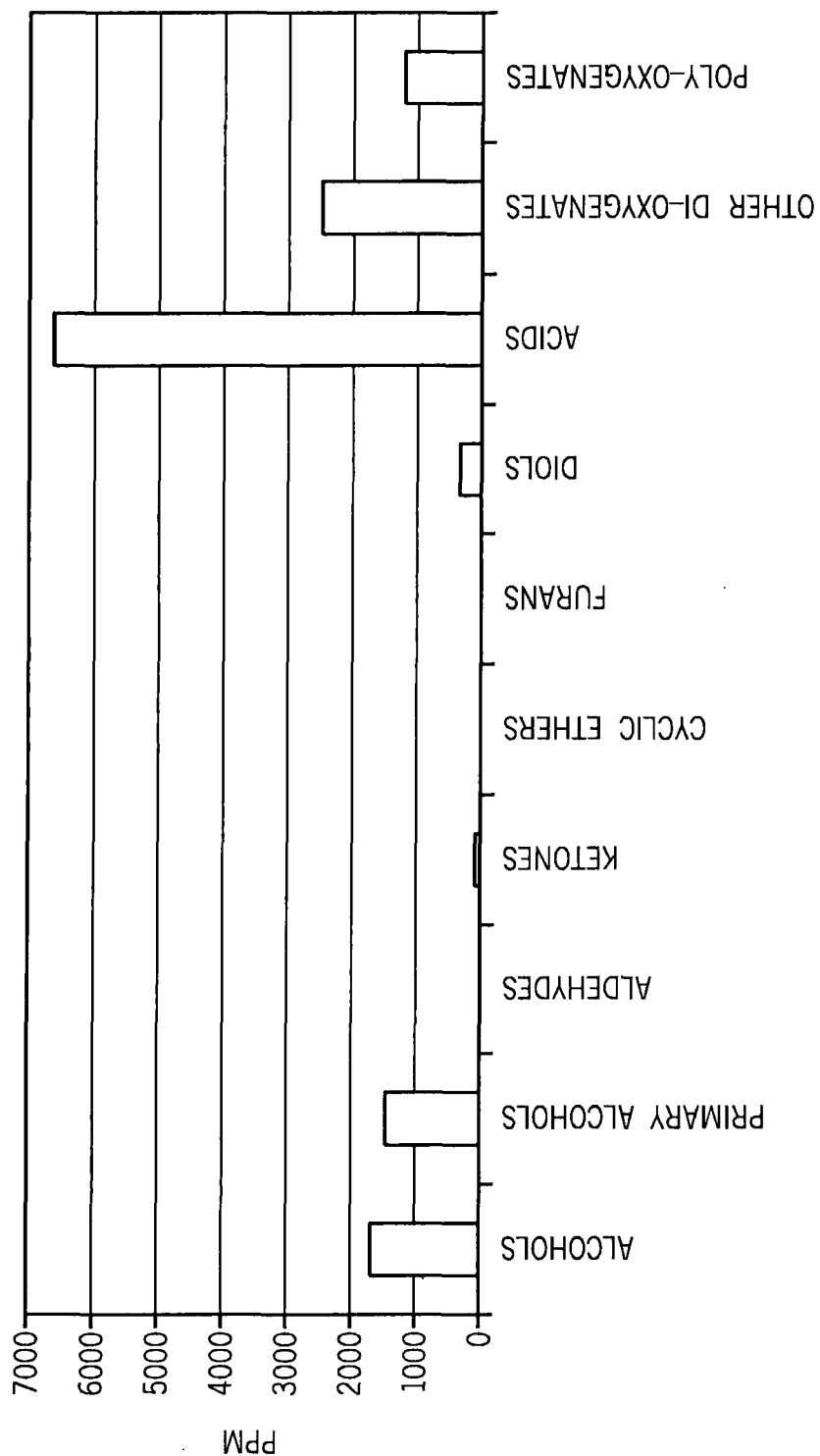
FIG. 22 is a graph providing the product distribution from the deconstruction of corn stover according to the present invention.
Figure 23:
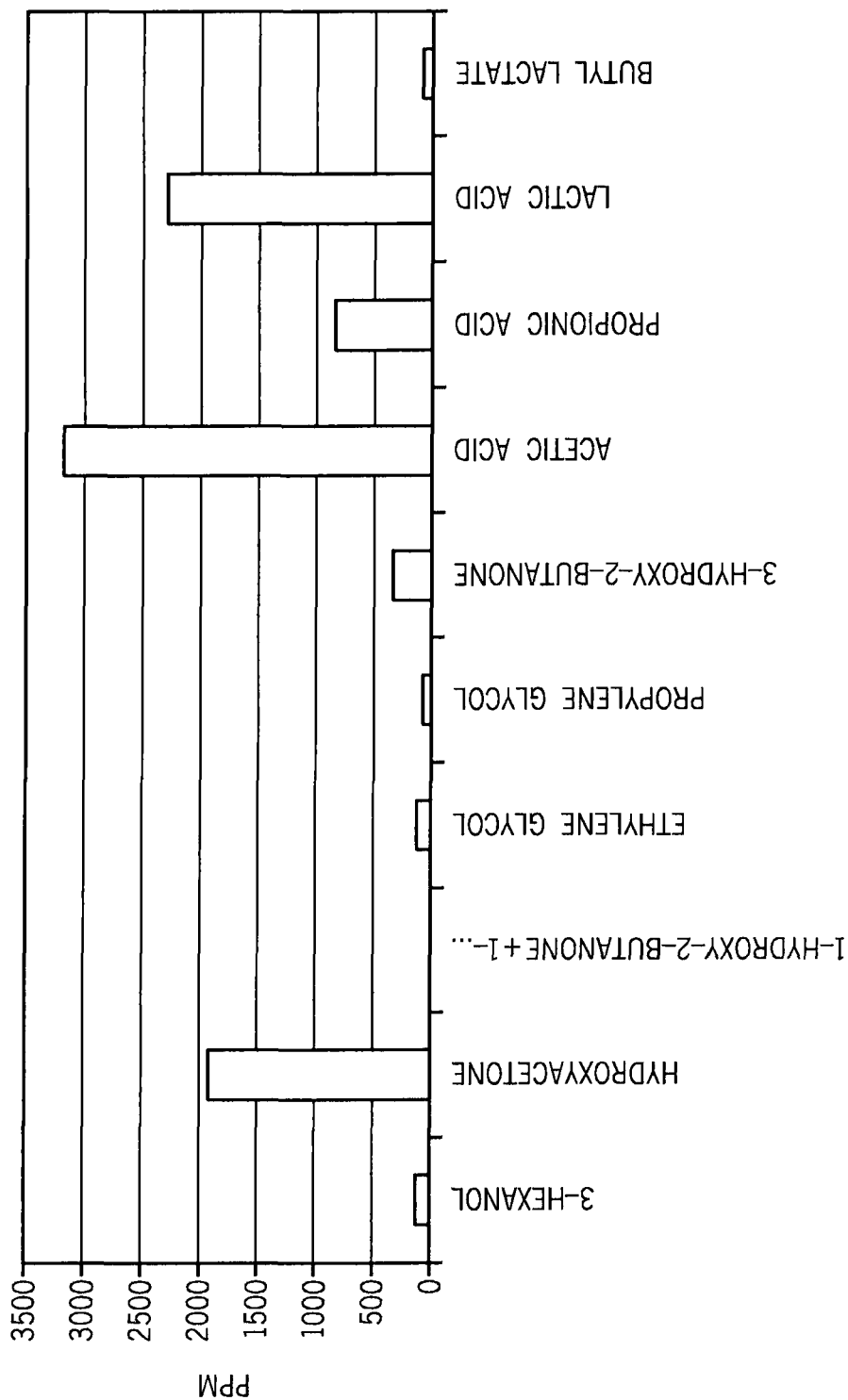
FIG. 23 is a graph providing the product speciation from the deconstruction of corn stover according to the present invention.

The system 10 described above was used to deconstruct corn stover and thereby produce feedstock for biofuel and biochemical manufacturing processes. A catalyst, 2% Pd 2% Ag on tungstated zirconia support, was used for deconstruction of corn stover. The pressurization vessel operation described above was used to achieve a pressure differential of 100 to 150 psig between the pressurization vessel chamber 26 and the deconstruction vessel 94, Reactor conditions were 10% (w/v) corn stover in water, 1:3 catalyst:corn stover, 240° C.-285° C., 950 psi-1100 psi $H_2$. Product distribution and speciation are summarized in FIGS. 22 and 23, respectively.

From the above description and examples, it should be apparent that the present invention provides improved systems and methods for producing feedstock for biofuel and biochemical manufacturing processes. In particular, the system includes components that are capable of transferring relatively high concentrations of solid biomass by selectively maintaining a pressure differential between the pressurization vessel and the deconstruction vessel. Upon opening the valve connecting the vessels, biomass is transferred to the deconstruction vessel due to the pressure differential. The system also recycles a deconstruction catalyst which thereby increases the throughput compared to previous systems.

It is specifically intended that the present invention not be limited to the embodiments and illustrations contained herein, but include modified forms of those embodiments including portions of the embodiments and combinations of elements of different embodiments as defined within the scope of the following claims.

What is claimed is:

1. An apparatus for producing biomass-derived feedstocks for biofuel and biochemical manufacturing processes, the apparatus comprising:
   (i) a biomass hopper configured to receive biomass to be converted into the biomass-derived feedstock;
   (ii) a pressurization vessel in selective communication with the biomass hopper to selectively receive the biomass from the biomass hopper and provide a pressurized biomass, the pressurization vessel including:
      (a) a pressurized fluid inlet such that the pressurization vessel is configured to selectively receive pressurized fluid;
      (b) a catalyst inlet such that the pressurization vessel is configured to selectively receive a catalyst;
   (iii) a deconstruction vessel in selective communication with the pressurization vessel to selectively receive the pressurized biomass and the catalyst from the pressurization vessel, the deconstruction vessel being configured to convert the pressurized biomass into the biomass-derived feedstock and one or more gaseous products; and
   (iv) a valve in operable communication between the pressurization vessel and the deconstruction vessel, wherein the valve is operable to move from a closed position to an open position, and wherein the valve in the closed position is operable to isolate the pressurization vessel from the deconstruction vessel and permit the pressurized fluid to create a pressure differential between the pressurization vessel and the deconstruction vessel, and wherein the valve in the open position is operable to permit fluid communication between the pressurization vessel and the deconstruction vessel such that the pressurization vessel delivers the pressurized biomass and the catalyst to the deconstruction vessel due to the pressure differential.

2. The apparatus of claim 1, further comprising a gas separating vessel in selective communication with the deconstruction vessel to selectively receive the biomass-derived feedstock and the catalyst from the deconstruction vessel, the gas separating vessel being configured to separate gas from the biomass-derived feedstock and the catalyst.

3. The apparatus of claim 2, further comprising a gravitational settling vessel in selective communication with the gas separating vessel to selectively receive the biomass-derived feedstock and the catalyst from the gas separating vessel, the gravitational settling vessel being configured to permit the biomass-derived feedstock and the catalyst to separate from each other.

4. The apparatus of claim 3, further comprising a return conduit in communication with the gravitational settling vessel and the catalyst inlet of the pressurization vessel to return the catalyst to the pressurization vessel.

5. The apparatus of claim 4, further comprising a pump connected along the return conduit and being configured to direct the catalyst from the gravitational settling vessel to the pressurization vessel.

6. The apparatus of claim 4, further comprising a solvent supply conduit in communication with the return conduit to deliver solvent to the return conduit to direct the catalyst to the pressurization vessel.

7. The apparatus of claim 3, further comprising a collection vessel in communication with the gravitational settling vessel to receive the biomass-derived feedstock.

8. The apparatus of claim 3, further comprising:
   a delivery conduit in communication with the deconstruction vessel and the gas separating vessel to deliver the biomass-derived feedstock, gas and the catalyst from the deconstruction vessel to the gravitational settling vessel;
   a pressurized fluid conduit in communication with the pressurized fluid inlet to deliver the pressurized fluid to the pressurized vessel; and
   a deconstruction vessel bypass conduit in communication with the pressurized fluid conduit and the delivery conduit to deliver the pressurized fluid from the pressurized fluid conduit directly to the delivery conduit.

9. The apparatus of claim 1, further comprising a delivery screw configured to direct biomass from the biomass hopper to the pressurization vessel.

10. The apparatus of claim 1, further comprising a knockout pot in communication with the deconstruction vessel to receive the gaseous products from the deconstruction vessel and collect the gaseous products.

11. The apparatus of claim 10, wherein the gaseous products comprise condensable products, and wherein the knockout pot provides an alarm when filled with the condensable products.

12. The apparatus of claim 1, wherein the apparatus further comprises a deoxygenation assembly in selective communication with the deconstruction vessel to selectively receive at least a portion of the biomass-derived feedstock from the deconstruction vessel, the deoxygenation assembly being configured to convert the biomass-derived feedstock into mono-oxygenates.

13. The apparatus of claim 12, wherein the apparatus further comprises a downstream processing assembly in selective communication with the deoxygenation assembly to selectively receive mono-oxygenates from the deoxygenation assembly, the downstream processing assembly being configured to convert mono-oxygenates to alkanes, alkenes, and aromatics.

14. The apparatus of claim 12, wherein the apparatus further comprises a solvent separation assembly in selective communication with the deoxygenation assembly and deconstruction vessel to selectively receive mono-oxygenates from the deoxygenation assembly and deliver mono-oxygenates to the deconstruction vessel.

15. The apparatus of claim 1, wherein the pressurization vessel further includes a biomass inlet through which the pressurization vessel receives biomass from the biomass hopper.

16. The apparatus of claim 15, wherein the pressurized fluid is a pressurized gas, and further comprising a pressurized gas supply configured to deliver the pressurized gas to the pressurization vessel via the pressurized fluid inlet.

17. An apparatus for converting biomass to biomass-derived feedstock for biofuel and biochemical manufacturing processes, the apparatus comprising:
a deconstruction vessel configured to selectively receive biomass and a catalyst, and the deconstruction vessel being configured to convert the biomass into the biomass-derived feedstock;
a gravitational settling vessel in selective communication with the deconstruction vessel to selectively receive the biomass-derived feedstock and the catalyst from the deconstruction vessel, the gravitational settling vessel being configured to permit the biomass-derived feedstock and the catalyst to separate from each other; and
a return conduit in communication with the gravitational settling vessel and the deconstruction vessel to return the catalyst to the deconstruction vessel.

18. The apparatus of claim 17, further comprising a solvent supply conduit in communication with the return conduit to deliver solvent to the return conduit to direct the catalyst to the deconstruction vessel.

19. The apparatus of claim 17, further comprising a collection vessel in communication with the gravitational settling vessel to receive the biomass-derived feedstock.

20. The apparatus of claim 17, further comprising a gas separating vessel in selective communication with the deconstruction vessel to selectively receive the biomass-derived feedstock and the catalyst from the deconstruction vessel, the gas separating vessel being configured to separate gas from the biomass-derived feedstock and the catalyst and deliver the biomass-derived feedstock and the catalyst to the gravitational settling vessel.

21. A method of converting biomass to biomass-derived feedstock for biofuel and biochemical manufacturing processes, the method comprising the steps of:
delivering biomass to a biomass hopper;
transferring biomass from the biomass hopper to a pressurization vessel;
delivering a catalyst to the pressurization vessel;
pressurizing the biomass and the catalyst contained in the pressurization vessel;
transferring pressurized biomass and the catalyst from the pressurization vessel to a deconstruction vessel;
converting the pressurized biomass to a biomass-derived feedstock within the deconstruction vessel;
transferring the biomass-derived feedstock and the catalyst from the deconstruction vessel to a settling tank;
separating the biomass-derived feedstock from the catalyst in the settling tank;
transferring the catalyst from the settling tank to the pressurization vessel; and
collecting the biomass-derived feedstock.

22. The method of claim 21, wherein the step of transferring the pressurized biomass and the catalyst from the pressurization vessel to the deconstruction vessel includes creating a pressure differential between the pressurization vessel and the deconstruction vessel.

23. The method of claim 22, wherein the pressure differential is between substantially 10 psig to 500 psig.

24. The method of claim 23, wherein the pressure differential is between about 100 psig to 150 psig.

25. The method of claim 21, wherein the step of transferring the pressurized biomass and the catalyst from the pressurization vessel to the deconstruction vessel includes delivering the pressurized biomass to the deconstruction vessel at a concentration of at least 0.5 percent by weight.

26. The method of claim 21, wherein the step of transferring biomass from the biomass hopper to the pressurization vessel includes transferring the biomass using a delivery screw.

27. The method of claim 21, wherein the steps of converting biomass to the biomass-derived feedstock within the deconstruction vessel and separating the biomass-derived feedstock from the catalyst in the settling tank occur simultaneously for different portions of the biomass and the biomass-derived feedstock.

28. The method of claim 21, further comprising the step of separating gases from the biomass-derived feedstock in a gas separating vessel before separating the biomass-derived feedstock from the catalyst in the settling tank.

29. The method of claim 21, wherein the step of pressurizing the biomass and the catalyst contained in the pressurization vessel includes delivering a pressurized fluid to the pressurization vessel.

30. The method of claim 29, further comprising the step of venting the pressurization vessel after the step of transferring the pressurized biomass and the catalyst from the pressurization vessel to the deconstruction vessel.

31. The method of claim 21, wherein the step of converting biomass to the biomass-derived feedstock within the deconstruction vessel includes converting the biomass to the biomass-derived feedstock and gaseous products, and further comprising the step of directing the gaseous products from the deconstruction vessel to a knockout pot for collection.

32. The method of claim 31, wherein the step of converting the biomass to the biomass-derived feedstock within the deconstruction vessel includes sparging a stream of pressurized gas through the biomass and the catalyst in the deconstruction vessel to direct the gaseous products from the deconstruction vessel toward the knockout pot.

33. An apparatus for producing biomass-derived feedstocks for biofuel and biochemical manufacturing processes, the apparatus comprising:
a biomass hopper configured to receive biomass to be converted into the biomass-derived feedstock;
a deconstruction vessel in selective communication with the biomass hopper to selectively receive biomass from the biomass hopper and a catalyst, and the deconstruction vessel being configured to convert the biomass into the biomass-derived feedstock and gaseous products;

a gravitational settling vessel in selective communication with the deconstruction vessel to selectively receive the biomass-derived feedstock and the catalyst from the deconstruction vessel, the gravitational settling vessel being configured to permit the biomass-derived feedstock and the catalyst to separate from each other; and a knockout pot in communication with the deconstruction vessel to receive the gaseous products from the deconstruction vessel and collect the gaseous products.

34. The apparatus of claim 33, wherein the knockout pot provides an alarm when filled with the gaseous products.

35. The apparatus of claim 34, wherein the knockout is a first knockout pot, and further comprising a second knockout pot configured to receive the gaseous product when the first knockout pot is filled with the gaseous products.

* * * * *